(12) United States Patent
Grumbo

(10) Patent No.: US 8,590,652 B2
(45) Date of Patent: Nov. 26, 2013

(54) REFUSE VEHICLE WITH UNIQUE CAB AND METHOD OF MANUFACTURE

(76) Inventor: Eldon Grumbo, Malibu, CA (US)

( * ) Notice: Subject to any disclaimer, the term of this patent is extended or adjusted under 35 U.S.C. 154(b) by 0 days.

(21) Appl. No.: 13/288,171

(22) Filed: Nov. 3, 2011

(65) Prior Publication Data

US 2012/0112492 A1    May 10, 2012

Related U.S. Application Data

(63) Continuation of application No. PCT/US2010/033546, filed on May 4, 2010.

(60) Provisional application No. 61/215,423, filed on May 5, 2009.

(51) Int. Cl.
*B62D 33/067* (2006.01)

(52) U.S. Cl.
USPC ............ 180/68.6; 180/89.14; 296/190.05

(58) Field of Classification Search
USPC ............ 180/89.14, 68.6, 89.13, 89.16, 89.18, 180/89.19, 89.17, 271; 296/190.5, 190.06, 296/101; 29/428; 169/24
See application file for complete search history.

(56) References Cited

U.S. PATENT DOCUMENTS

| | | | | |
|---|---|---|---|---|
| 2,376,491 A | | 5/1945 | Kinney | |
| 2,396,506 A | * | 3/1946 | Harris | 180/89.18 |
| 2,502,622 A | * | 4/1950 | Harris | 180/89.14 |
| 2,699,615 A | * | 1/1955 | Malvese | 37/236 |
| 2,700,428 A | * | 1/1955 | Nallinger | 180/89.19 |
| 2,740,487 A | * | 4/1956 | Murty et al. | 180/89.14 |
| 2,753,947 A | * | 7/1956 | Mach | 180/89.18 |
| 2,838,126 A | * | 6/1958 | Gleasman | 180/89.14 |
| 2,927,800 A | * | 3/1960 | Nallinger | 280/788 |
| 3,051,259 A | * | 8/1962 | Lorenz | 180/89.14 |
| 3,055,699 A | * | 9/1962 | May | 296/190.08 |
| 3,224,525 A | * | 12/1965 | Letzel et al. | 180/89.19 |
| 3,288,237 A | * | 11/1966 | Muller | 180/68.1 |
| 3,486,646 A | | 12/1969 | O'Brien et al. | |
| 3,641,744 A | * | 2/1972 | Culbert et al. | 55/319 |
| 3,853,368 A | * | 12/1974 | Eichelsheim | 180/89.14 |

(Continued)

FOREIGN PATENT DOCUMENTS

WO   PCT/US2010/033546   3/2012

OTHER PUBLICATIONS

Intl Search Report and Written Opinion.

*Primary Examiner* — Katy M Ebner
*Assistant Examiner* — Brodie Follman
(74) *Attorney, Agent, or Firm* — John J. Connors; Connors & Assoc. pc

(57) ABSTRACT

A refuse vehicle comprises a cab mounted to a front end of a mass-produced, standard truck chassis without relocating the radiator mounted in its normal position on the chassis. The cab is attached to pivot about a fulcrum between a covered position and an uncovered position. The fulcrum is near the front end and beneath an underside of the chassis. A radiator compartment in the cab has a forward portion in which the radiator is seated when the cab is mounted to the mass-produced, standard truck chassis and is in the covered position. The cab has a floor that in the covered position is above ground level a predetermined distance to enable at least an average sized adult to enter a side door opening by stepping from ground level directly into the cab without the aid of a step.

7 Claims, 25 Drawing Sheets

(56) References Cited

U.S. PATENT DOCUMENTS

| | | | |
|---|---|---|---|
| 3,882,951 A | 5/1975 | Conley | |
| 4,210,221 A * | 7/1980 | McMillen et al. | 180/328 |
| 4,253,700 A * | 3/1981 | Di Francescantonio | 296/190.05 |
| 4,378,856 A * | 4/1983 | Miller | 180/89.14 |
| 4,445,584 A * | 5/1984 | Kimura et al. | 180/69.22 |
| 4,813,736 A * | 3/1989 | Schubert et al. | 296/190.05 |
| 4,921,062 A * | 5/1990 | Marlowe | 180/89.14 |
| 5,033,567 A * | 7/1991 | Washburn et al. | 180/89.12 |
| 5,156,230 A * | 10/1992 | Washburn | 180/170 |
| 5,193,608 A * | 3/1993 | Sekine et al. | 165/41 |
| 5,201,379 A * | 4/1993 | Penzotti et al. | 180/89.18 |
| 5,474,413 A * | 12/1995 | Georg | 414/408 |
| 5,501,567 A * | 3/1996 | Lanzdorf et al. | 414/408 |
| 5,673,767 A * | 10/1997 | Uno et al. | 180/89.12 |
| 6,105,698 A * | 8/2000 | Tsuyama et al. | 180/89.1 |
| 6,357,820 B1 * | 3/2002 | Nagatsuka et al. | 296/190.06 |
| 6,793,028 B2 * | 9/2004 | Pack | 180/68.1 |
| 6,871,875 B2 * | 3/2005 | Grimm et al. | 280/785 |
| 7,213,872 B2 * | 5/2007 | Ronacher et al. | 296/190.05 |
| 7,784,554 B2 * | 8/2010 | Grady et al. | 169/24 |
| 7,992,665 B2 * | 8/2011 | Giovannini et al. | 180/69.2 |
| 8,020,925 B2 * | 9/2011 | Miura et al. | 296/190.05 |
| 2002/0117345 A1 * | 8/2002 | Sztykiel et al. | 180/292 |
| 2003/0037979 A1 * | 2/2003 | Schwalbe | 180/89.14 |
| 2005/0115752 A1 * | 6/2005 | Ronacher et al. | 180/89.14 |
| 2007/0284156 A1 * | 12/2007 | Grady et al. | 180/53.8 |
| 2007/0286736 A1 * | 12/2007 | Grady et al. | 417/34 |
| 2008/0196678 A1 * | 8/2008 | Kakishita et al. | 123/41.49 |
| 2010/0060033 A1 * | 3/2010 | Miura et al. | 296/190.05 |
| 2011/0024213 A1 * | 2/2011 | Giovannini et al. | 180/69.2 |
| 2012/0193109 A1 * | 8/2012 | Moore et al. | 169/24 |

* cited by examiner

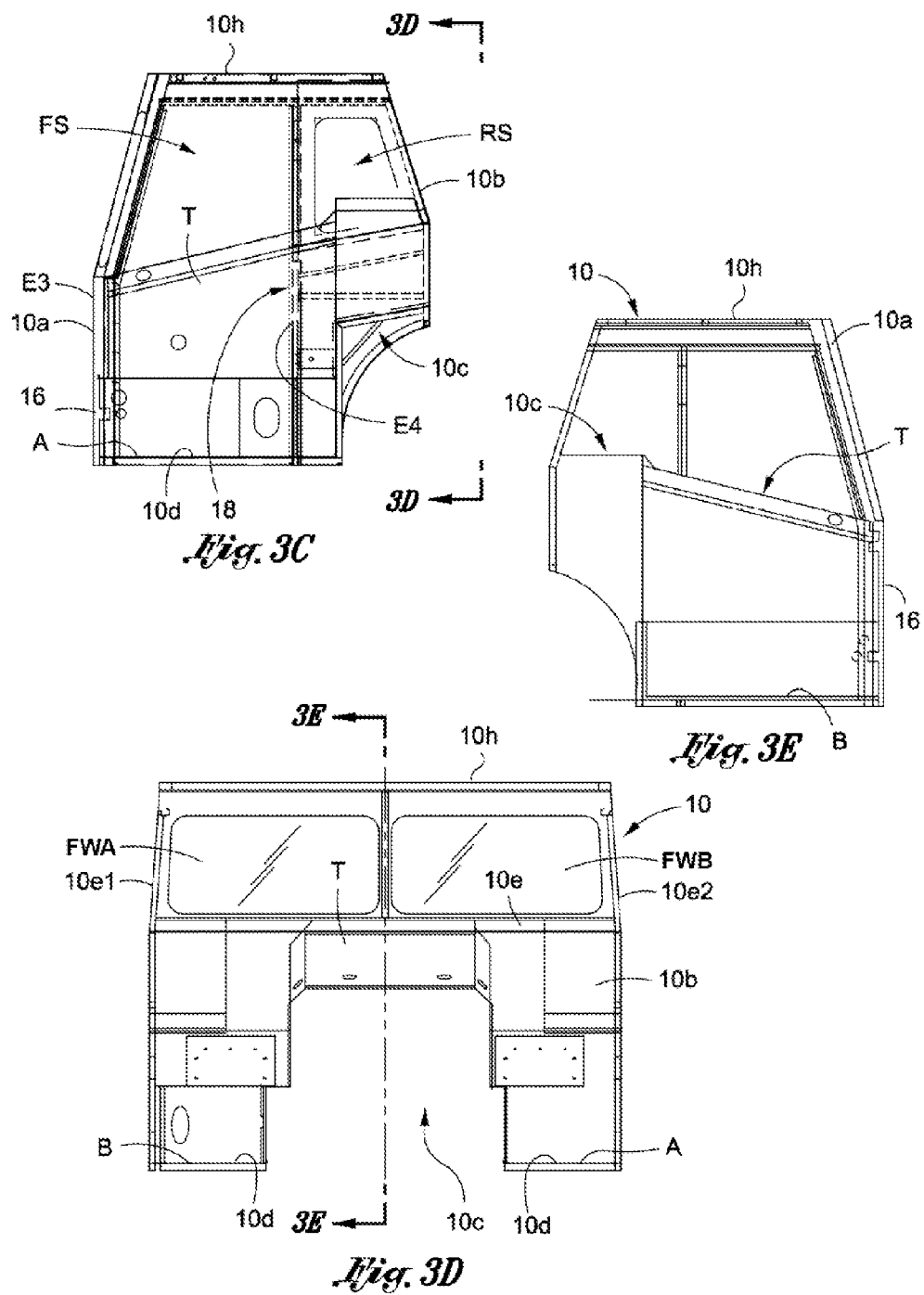

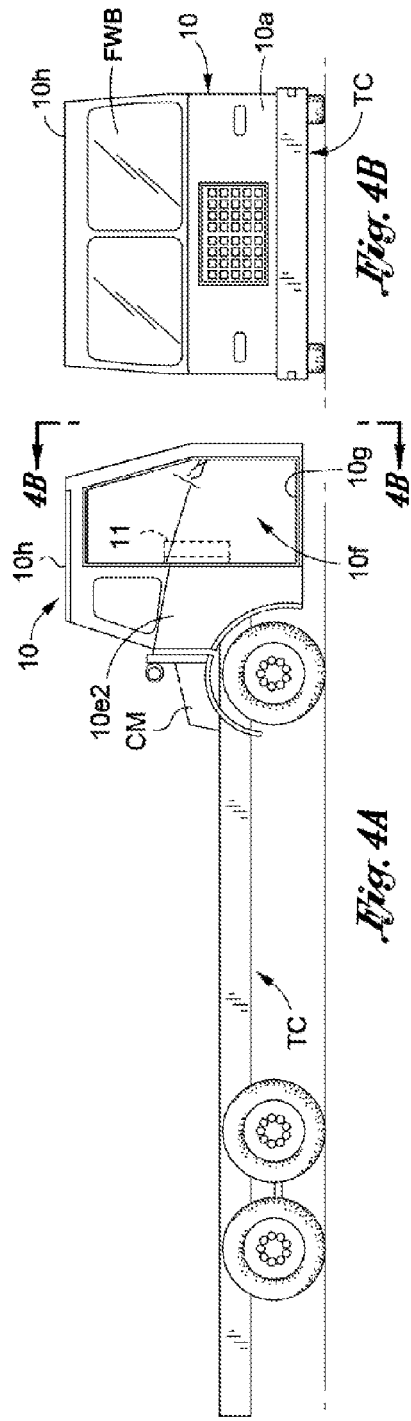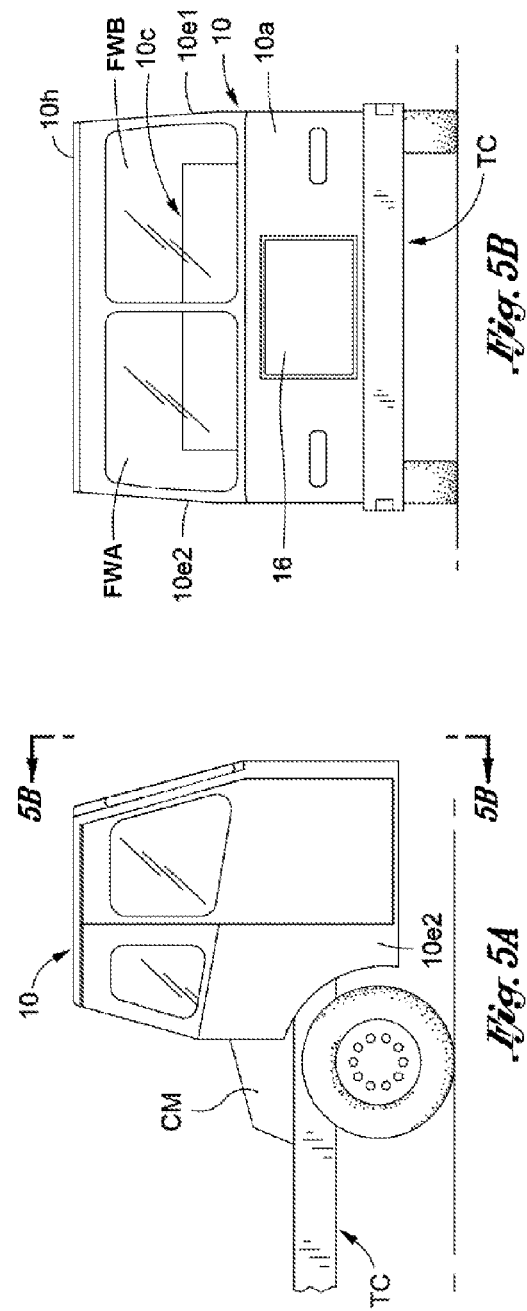

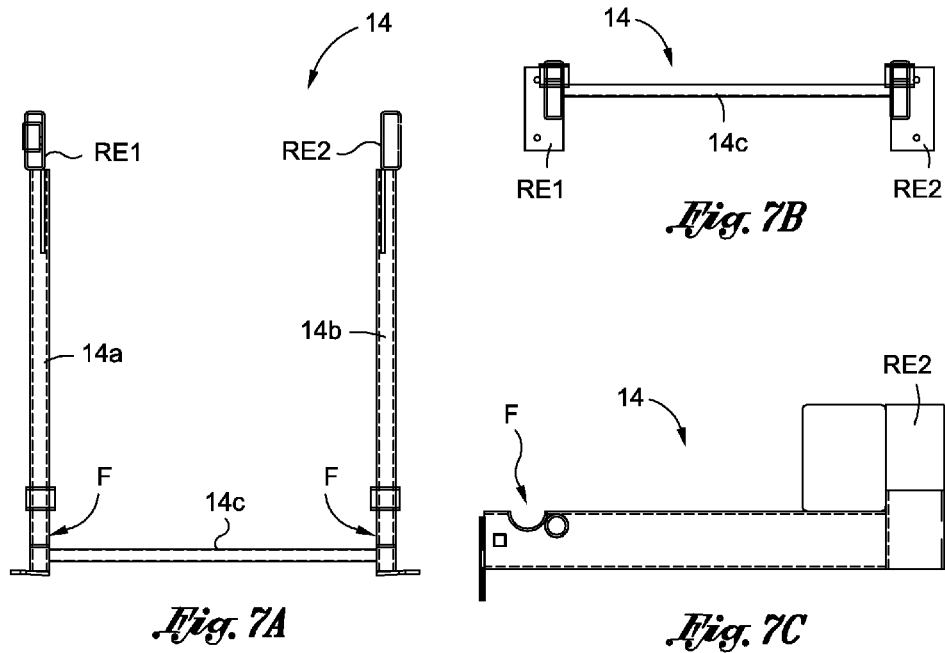
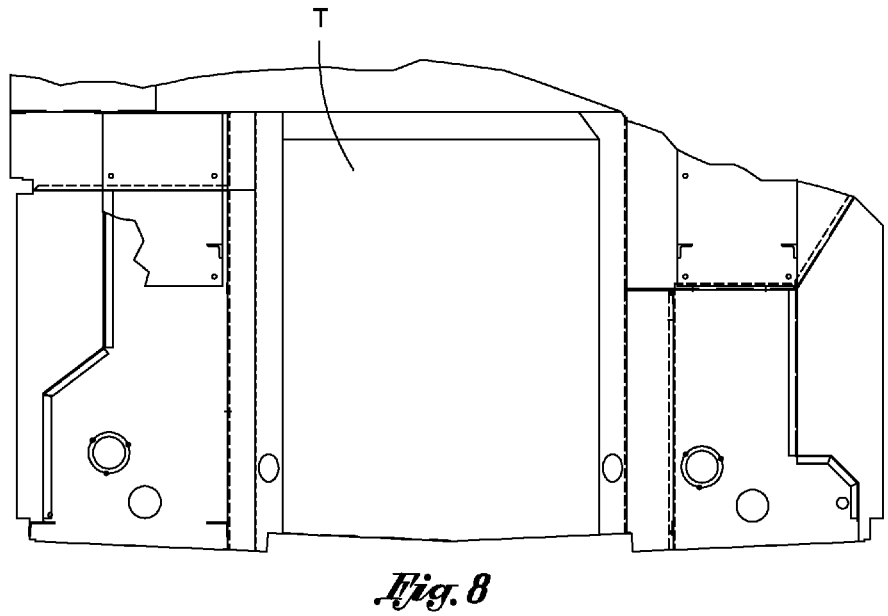

REFUSE VEHICLE WITH UNIQUE CAB AND METHOD OF MANUFACTURE

RELATED PATENT APPLICATIONS & INCORPORATION BY REFERENCE

This continuation patent application is based on international patent application number PCT/US2010/033546 filed May 4, 2010, application which claimed the benefit under 35 USC 119(e) of U.S. Provisional Patent Application No. 61/215,423, entitled "REFUSE VEHICLE WITH UNIQUE CAB AND METHOD OF MANUFACTURE," filed May 5, 2009. This related application is incorporated herein by reference and made a part of this application. If any conflict arises between the disclosure of the invention in this PCT application and that in the related provisional application, the disclosure in this utility application shall govern. Moreover, any and all U.S. patents, U.S. patent applications, and other documents, hard copy or electronic, cited or referred to in this application are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The words "substantially" and "essentially" have equivalent meanings.

BACKGROUND

Refuse trucks are specialty vehicles comprising a chassis (including an engine, transmission and axles), a cab, and a refuse storage container body. The refuse storage container body is generally either rear or top loaded, and regardless of configuration, has a packer that compresses trash to insure a maximum load. Hydraulic pumps to power the packer and raise and lower the container body are attached to the chassis and operated by the vehicle's engine. Mass-produced, standard truck chassis have a pair of substantially parallel, rails spaced apart about 35 inches with a radiator attached near the front end of the chassis frame to topsides of the rails, straddling the rails. The engine is attached to the rails behind and near the radiator in these mass-produced, standard truck chassis.

Refuse trucks are designed as cab over or cab forward, based on the position of the engine vis-à-vis the cab. In the cab over design, the cab is mounted on the standard chassis over the engine, resulting in its being significantly higher than street level. In the conventional cab forward design the engine is aft of the cab, which permits the cab to be at street level, increasing operator safety and comfort. In the conventional cab forward refuse trucks, the radiator is relocated with respect to the chassis. A radiator, or sometimes multiple radiators, are positioned between the pair of parallel truck chassis' rails. The cab is mounted to pivot on the forward end of chassis.

SUMMARY

My cab is designed to be mounted forward of the engine on a mass-produced, standard truck chassis using the standard radiator without relocating it between the chassis' rails. My cab is mounted to pivot and move between an uncovered position and a covered position that overlies essentially the entire radiator. The radiator is a component of the original equipment—a mass-produced, standard truck chassis and, in my refuse vehicle, this original radiator remains in its original location on the mass-produced, standard truck chassis. My cab is attached to the chassis either on-line or off-line. Consequently, only minor changes enable my cab to be mounted to a mass-produced, standard truck chassis. Both my cab in itself or, when combined with such a mass-produced, standard truck chassis, has one or more of the features depicted in the embodiments discussed in the section entitled "DETAILED DESCRIPTION OF SOME ILLUSTRATIVE EMBODIMENTS." The claims that follow define my method of manufacture, my cab, and my refuse vehicle comprising the combination of my cab and a standard truck chassis used to carry the container body of a refuse truck, distinguishing them from the prior art; however, without limiting the scope of my cab and such combination and method as expressed by these claims, in general terms, some, but not necessarily all, of their features are:

One, my refuse vehicle comprises a container body for trash and a mass-produced, standard truck chassis that carries the container body. The standard chassis has a chassis frame typically comprising a pair of substantially parallel rails. The rails are substantially linear and are spaced apart substantially from 30 to 38 inches. Each rail has a lower edge that is substantially from 26 to 36 inches above ground level and each lower edge lies in essentially the same horizontal plane. The length of the standard chassis typically is substantially from 280 to 335 inches. A radiator is attached to a topside of the frame near the frame's front end and an engine is attached to the topside behind and near the radiator. The radiator is centrally mounted along a longitudinal centerline of the chassis and has a width greater than the predetermined distance between the spaced apart parallel rails so the radiator straddles the rails and is oriented substantially at a right angle to the rails with opposed ends of the radiator extending beyond the rails. A pair of forward wheels is at the front end of the frame, each wheel being outboard of an adjacent rail.

Two, my cab avoids trapping heat because the radiator is above the frame and inside the cab. That places the engine, which is back of radiator, mostly outside the cab. Only a small forward portion of the engine is within my cab, no more than essentially 8 percent of the total volume of the engine. The outside location of the engine keeps heat from heating the cab interior and exterior. Other comparable cabs have their radiators forward to the front of the cab and between the frame rails. This causes the high engine heat to go to the interior and exterior of the other cabs. This creates tremendous radiator problems to reduce the cab heat. This could lead to engine failure and unsafe cab conditions.

Three, my cab is mounted, for example by a bracket, to the front end of the frame to enable the cab to pivot about a fulcrum between a covered position and an uncovered position. The fulcrum is in advance of the radiator and beneath the underside of the frame. The cab includes a lower base section with a cavity in a rear portion thereof configured to cover essentially all of the radiator when the cab is in the covered position. The cavity has a predetermined configuration so that, in one embodiment, the cab overlies essentially the entire radiator when the cab is in the covered position. In one embodiment, the cavity has a depth sufficient so that, when the cab is in the covered position covering essentially the entire radiator, a forward portion of the engine extends into the cavity. One version of a standard chassis includes a moveably mounted gearbox in a position that normally would interfere with mounting the cab to the standard chassis. This gearbox is repositioned to avoid interfering with mounting the cab to the standard chassis.

Four, the cab provides a rider compartment and includes a front side, a rear side, a floor side between the front side and the rear side, a side entryway with a door opening having a lower edge substantially flush with the floor side. In one embodiment, there is in both a starboard side and a port side a door opening. The rear side includes the cavity to form a radiator compartment that at least partially encloses the radiator when the cab is in the covered position. An air conduit in the rider compartment extends between an opening in the front side and an open portion in the rear side so air flows to the radiator as the engine is operated. In the covered position the floor side is above ground level a predetermined distance to enable at least an average sized, able-bodied adult person to enter the side entryway through the door opening by stepping from ground level directly into the cab without the aid of a step. The floor side may be above ground level in the covered position substantially from 16 to 22 inches. The cab includes an upper window section that joins the lower base section along a common junction. The lower base section may include a pair of opposed outer wheel housings in the rear side configured and positioned to overlie and partially cover the forward wheels when the cab is in the covered position. The lower base section may include the air conduit that is located about midway between the opposed side entryways.

My method of manufacture of a refuse vehicle comprises the step mounting my cab to a front end of a standard truck chassis. This may be on-line or off-line of the manufacture of the chassis. The cab is prefabricated and then attached to the chassis to pivot about a fulcrum between the covered position and uncovered position as discussed above.

These features are not listed in any rank order nor is this list intended to be exhaustive.

DESCRIPTION OF THE DRAWING

Some embodiments of my cab, vehicle and method of manufacture are discussed in detail in connection with the accompanying drawing, which is for illustrative purposes only. This drawing includes the following figures (Figs.), with like numerals indicating like parts:

FIG. 3C is a port side view of the embodiment of my cab shown in FIG. 2, the starboard side view being essentially a mirror image of the port side.

FIG. 3D is a rear view of the embodiment of my cab shown in FIG. 2.

FIG. 3E is a cross-sectional view taken along line 3E-3E of FIG. 3D.

FIG. 4A is a side elevational view of the cab shown in FIGS. 3A through 3E mounted to the front end of the standard truck chassis shown in FIGS. 1 through 1C with the side doors of the cab removed.

FIG. 4B is front view taken along line 4B-4B of FIG. 4B.

FIG. 5A is a fragmentary starboard side elevational view of the cab shown in FIGS. 3A through 3E mounted to the front end of the standard truck chassis shown in FIGS. 1 through 1C with the side doors attached to the cab.

FIG. 5B is front view taken along line 5B-5B of FIG. 5B.

FIG. 7A is a top plan view of the bracket shown in FIGS. 6A and 6B for mounting the cab to the standard truck chassis.

FIG. 7B is a front view of the bracket shown in FIGS. 6A and 6B for mounting the cab to the standard truck chassis.

FIG. 7C is a side view of the bracket shown in FIGS. 6A and 6B for mounting the cab to the standard truck chassis.

FIG. 8 is a top plan view of an air tunnel within my cab.

FIG. 13A is a perspective view looking into the interior of my cab through the front starboard side window.

FIG. 13B is a perspective view looking into the interior of my cab through the front port side window.

FIG. 13C is an interior perspective view looking into the interior of my cab through the port side entryway.

FIG. 13D is a perspective view looking at the port side of the rear portion of the interior of my cab.

FIG. 13E is a perspective view looking at the starboard side of the rear portion of the interior of my cab.

FIG. 13F is a perspective view looking at the port side of the front portion of the interior of my cab.

FIG. 13G is a perspective view looking at the starboard side of the front portion of the interior of my cab.

FIG. 13H is a perspective view of the port underneath surface of my cab looking towards the front side along an air conduit provided by the tunnel.

FIG. 13I is a perspective view of the starboard underneath surface of my cab looking towards the front side along an air conduit provided by the tunnel.

DETAILED DESCRIPTION OF SOME ILLUSTRATIVE EMBODIMENTS

Figure 1:
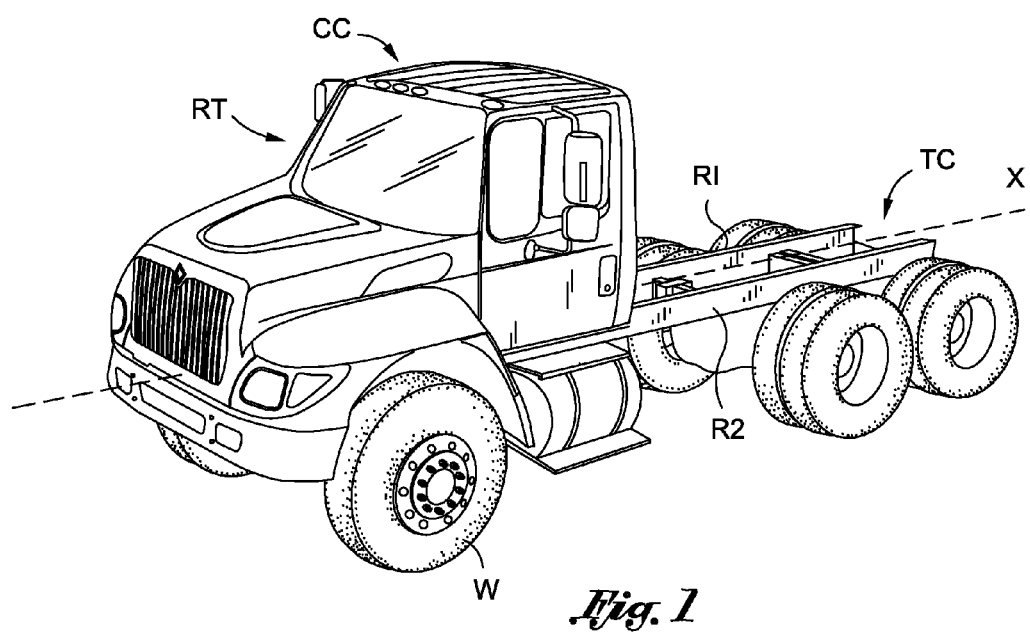
FIG. 1 is a perspective view of a standard truck chassis with a conventional cab mounted to the front of the chassis.
Figure 1A:
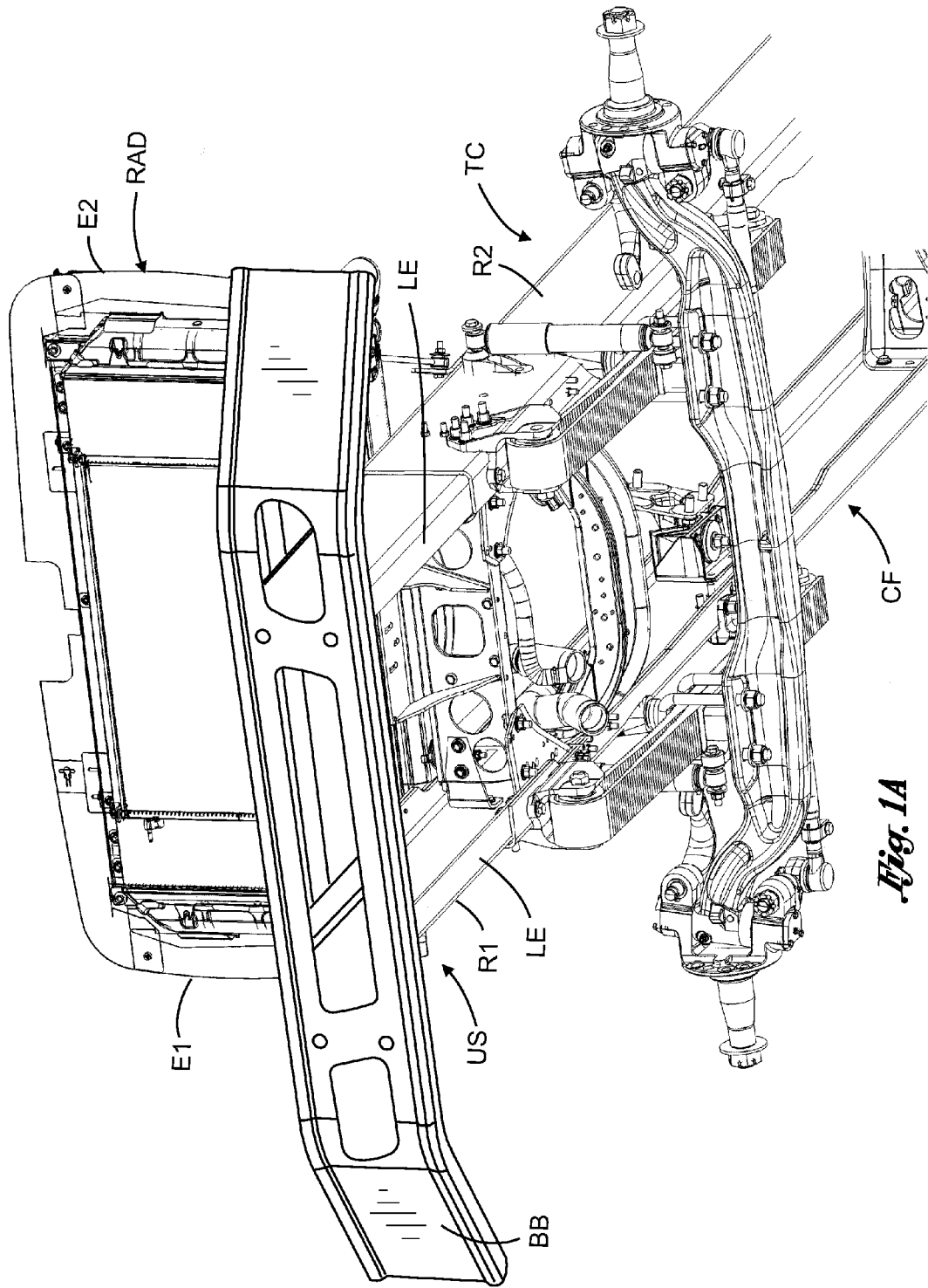
FIG. 1A is a fragmentary, front perspective view of an underside of the standard truck chassis shown in FIG. 1 with the cab removed and a radiator mounted to the chassis' topside.
Figure 1B:
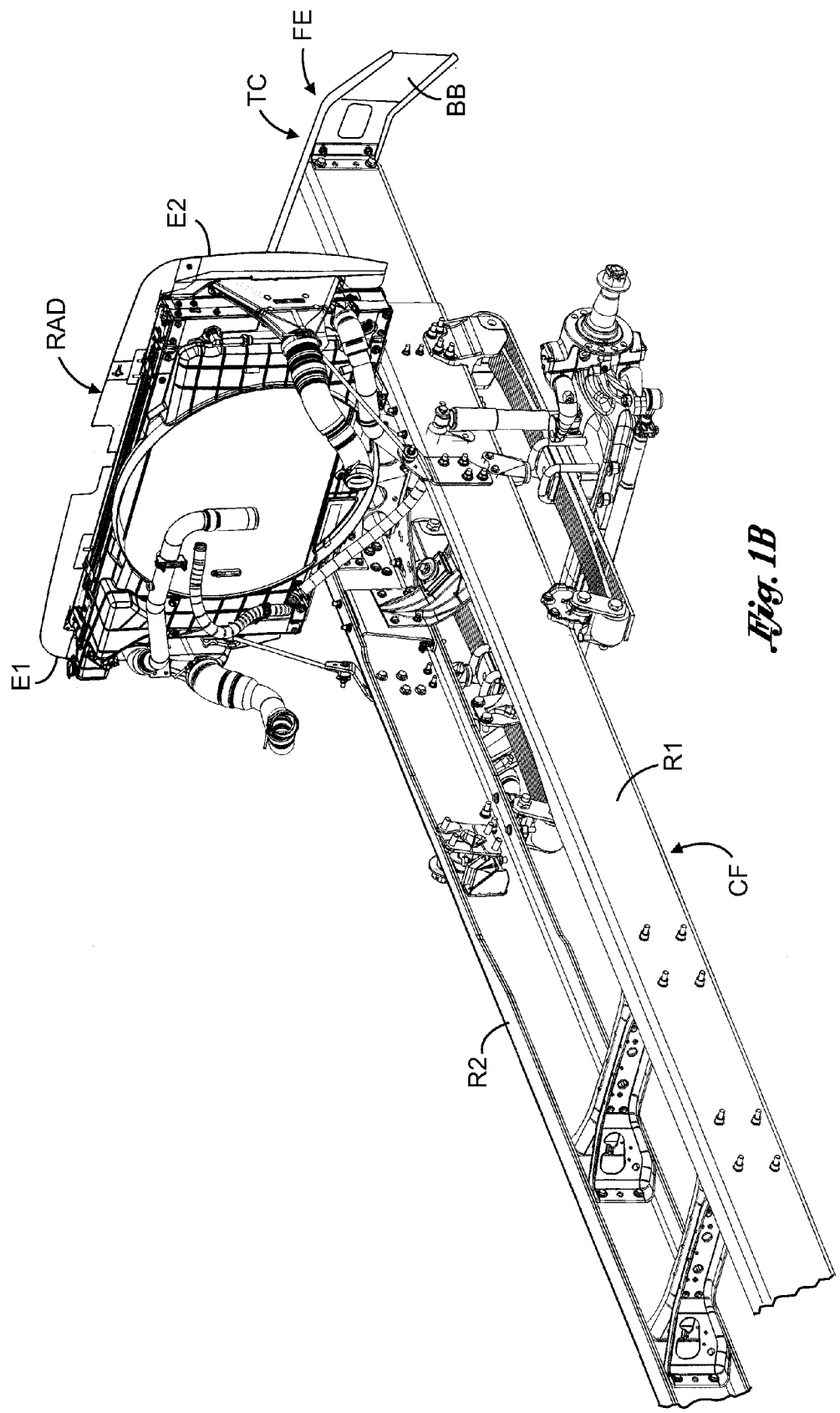
FIG. 1B is a fragmentary, rear perspective view of a topside of the standard truck chassis shown in FIG. 1 with the cab removed and a radiator mounted to the chassis' topside.
Figure 1C:
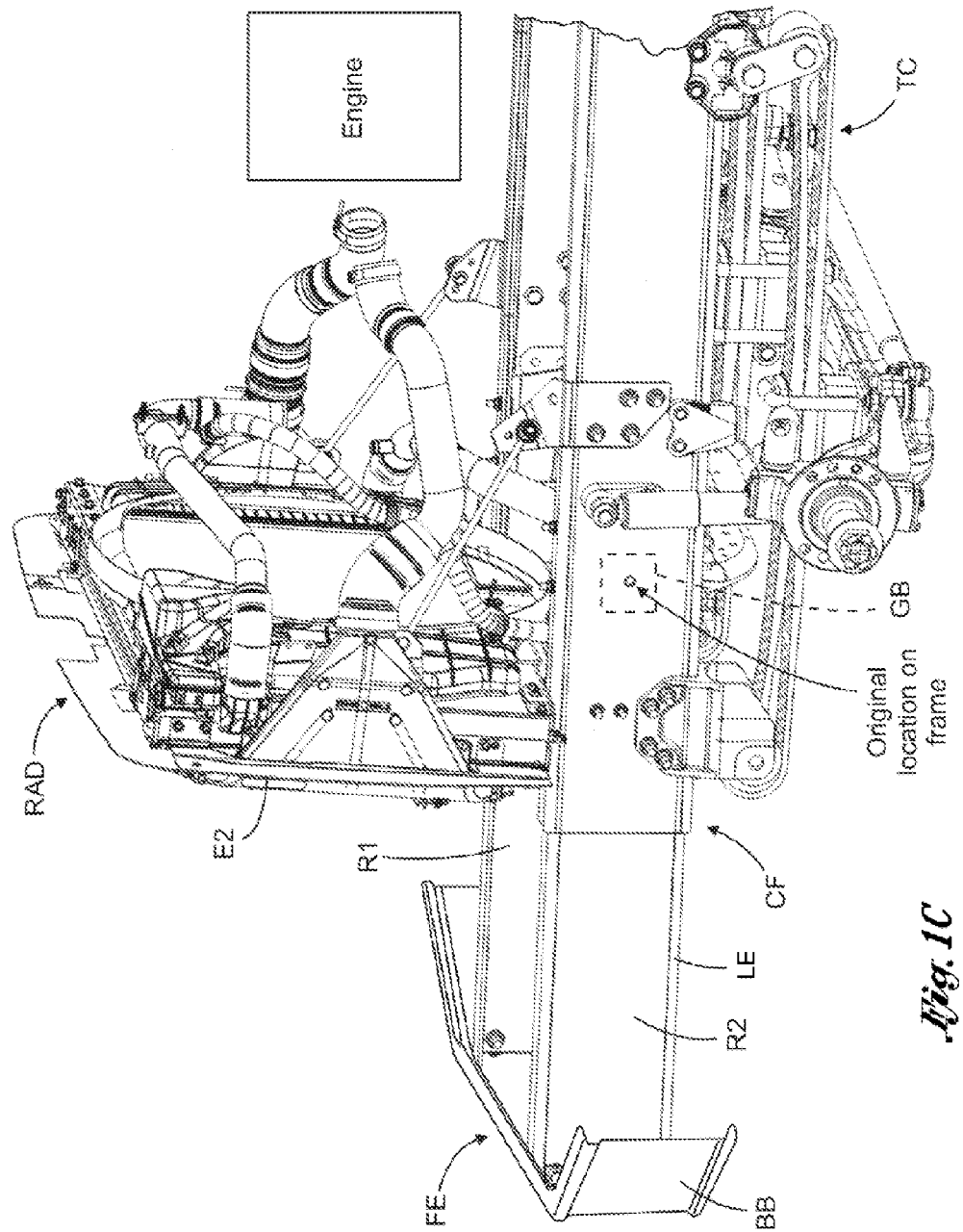
FIG. 1C is a fragmentary, side perspective view of the standard truck chassis shown in FIG. 1 with the cab removed a radiator mounted to the chassis' topside.

Standard Truck Chassis—FIGS. 1 through 1C

FIGS. 1 through 1C depict a conventional refuse truck RT having a standard truck chassis TC with a conventional, nose in front cab CC mounted to the chassis. Additionally, the standard truck chassis TC carries the refuse truck's container body (not shown) that holds trash. The standard truck chassis TC includes a chassis frame CF comprising a pair of substantially parallel, linear rails R1 and R2 spaced apart a predetermined distance substantially from 30 to 38 inches. Each rail R1 and R2 has a lower edge LE that is substantially from 26 to 36 inches above ground level and each lower edge lies in essentially the same horizontal plane. These lower edges are each approximately 28 inches above ground level. The chassis frame CF has a front end FE, a topside TS and an underside US, a radiator RAD attached to the topside near the front end of the chassis frame CF. An ENGINE is attached to the topside TS behind and near the radiator RAD, and the radiator is centrally mounted along a longitudinal centerline X of the truck chassis TC. The radiator RAD has a width greater than the predetermined distance d between the parallel rails R1 and R2 so the radiator straddles the rails and is oriented substantially at a right angle to the rails in both the horizontal and vertical directions. The opposed ends E1 and E2 of the radiator RAD extend beyond the rails R1 and R2. The distance the ends E1 and E2 overlap outer upper edges of the rails R1 and R2 is the same, substantially from 8 to 15 inches from the rail R1 or R2 as the case may be.

FIGS. 2 Through 13I and FIGS. 14A Through 14D

Figure 2:
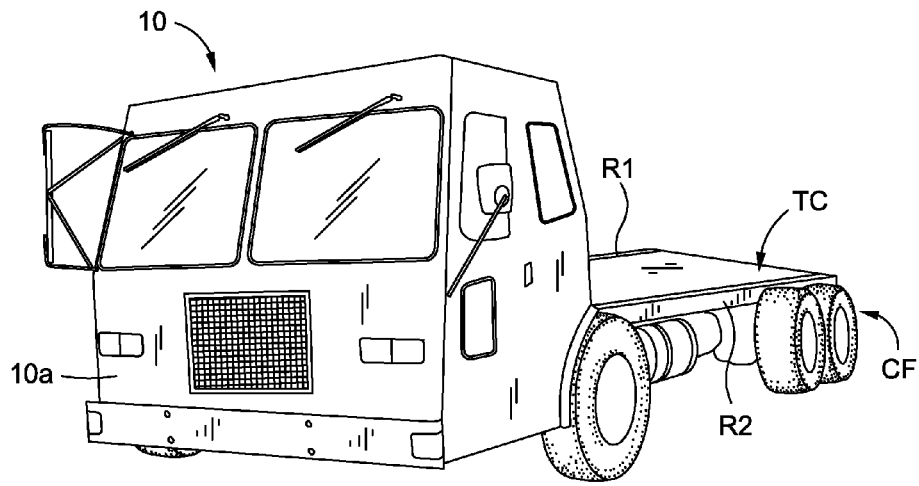
FIG. 2 is a perspective view of my cab mounted to the front end of the standard truck chassis shown in FIGS. 1 through 1C.
Figure 2A:
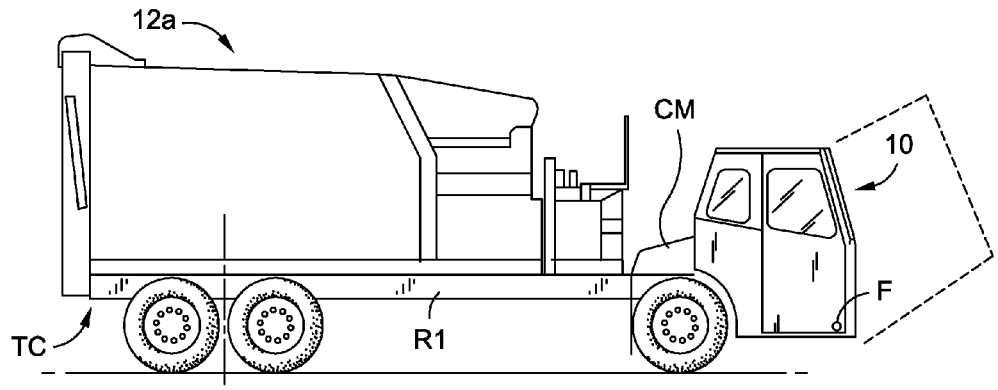
FIG. 2A is a side elevational view of one embodiment of my refuse vehicle using my cab as depicted in FIG. 2.
Figure 2B:
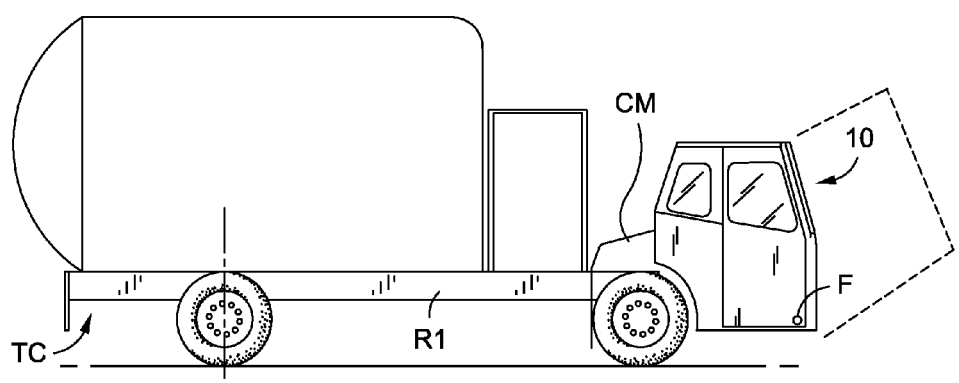
FIG. 2B is a side elevational view of another embodiment of my refuse vehicle using my cab as depicted in FIG. 2.
Figure 3A:
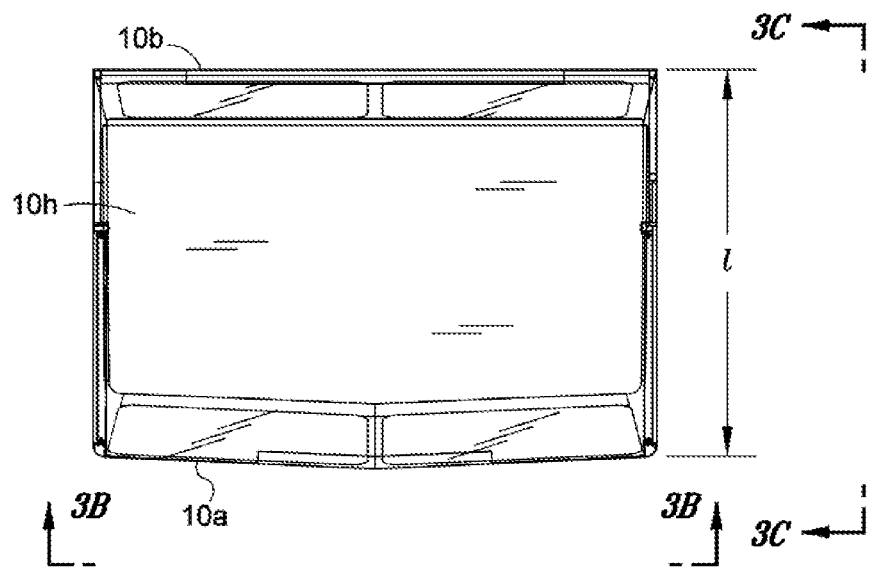
FIG. 3A is a top plan view of the embodiment of my cab shown in FIG. 2.
Figure 3B:
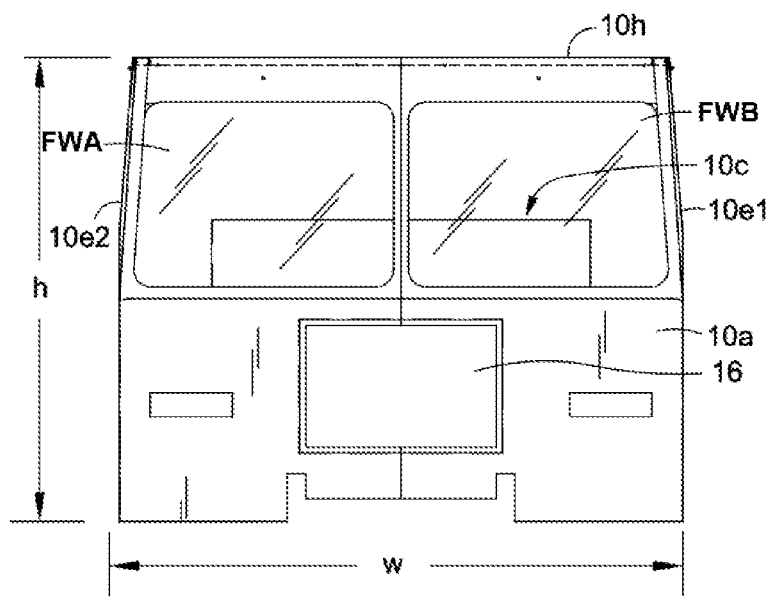
FIG. 3B is a front view of the embodiment of my cab shown in FIG. 2.

As illustrated in FIGS. 2, 2A and 2B, my truck comprises my cab 10 mounted to the front end FE of the chassis frame CF. Two embodiments of my truck are illustrated. In FIG. 2A, my refuse truck 10a is depicted as a 3-axle vehicle carrying a container body 12a having automatic control features. In FIG. 2B, my refuse truck 10b is depicted as a 2-axle vehicle carrying a container body 12b having manual control features. The manner in which my cab 10 is attached to the chassis frame CF enables the cab 10 to pivot about a fulcrum F between a covered position (solid lines FIGS. 2A and 2B) and an uncovered position (dotted lines FIGS. 2A and 2B). Rearward of my cab 10 is a separate, optional cover member CM. The cover member covers any portion of the ENGINE that is not covered by my cab 10 when my cab is in the covered position (solid lines FIGS. 2A and 2B).

As best depicted in FIGS. 3A through 3E and FIGS. 14A through 14D, my cab 10 is a box-like structure, typically constructed mainly of sheet steel fastened to a frame. It provides a rider compartment RC (FIG. 3B) comprising a lower base section LBS (FIG. 4A) and an upper window section UWS (FIG. 4A). My cab 10 is mounted to the chassis frame CF so that, in the covered position, the radiator RAD is aligned with an air opening 16 in my cab's front and is essentially entirely overlie or covered by a rear portion of my cab 10 to at least partially enclose the radiator. In the embodiment depicted, when in the covered position, my cab 10 covers essentially the entire radiator RAD and a portion of the front of the ENGINE, typically no more than about 8 volume percent of the engine. This accomplished by effectively lengthening the chassis frame CF using a cab-mounting bracket 14 attached to the front end FE of the chassis frame. The cab-mounting bracket 14 provides the fulcrum F, and upon attachment of the bracket to the chassis frame CF, the fulcrum F is near the front and beneath the underside US of the standard truck chassis TC. The fulcrum F is in advance of the radiator RAD and beneath the underside US of the chassis frame CF when my cab 10 is in the covered position.

Figure 6A:
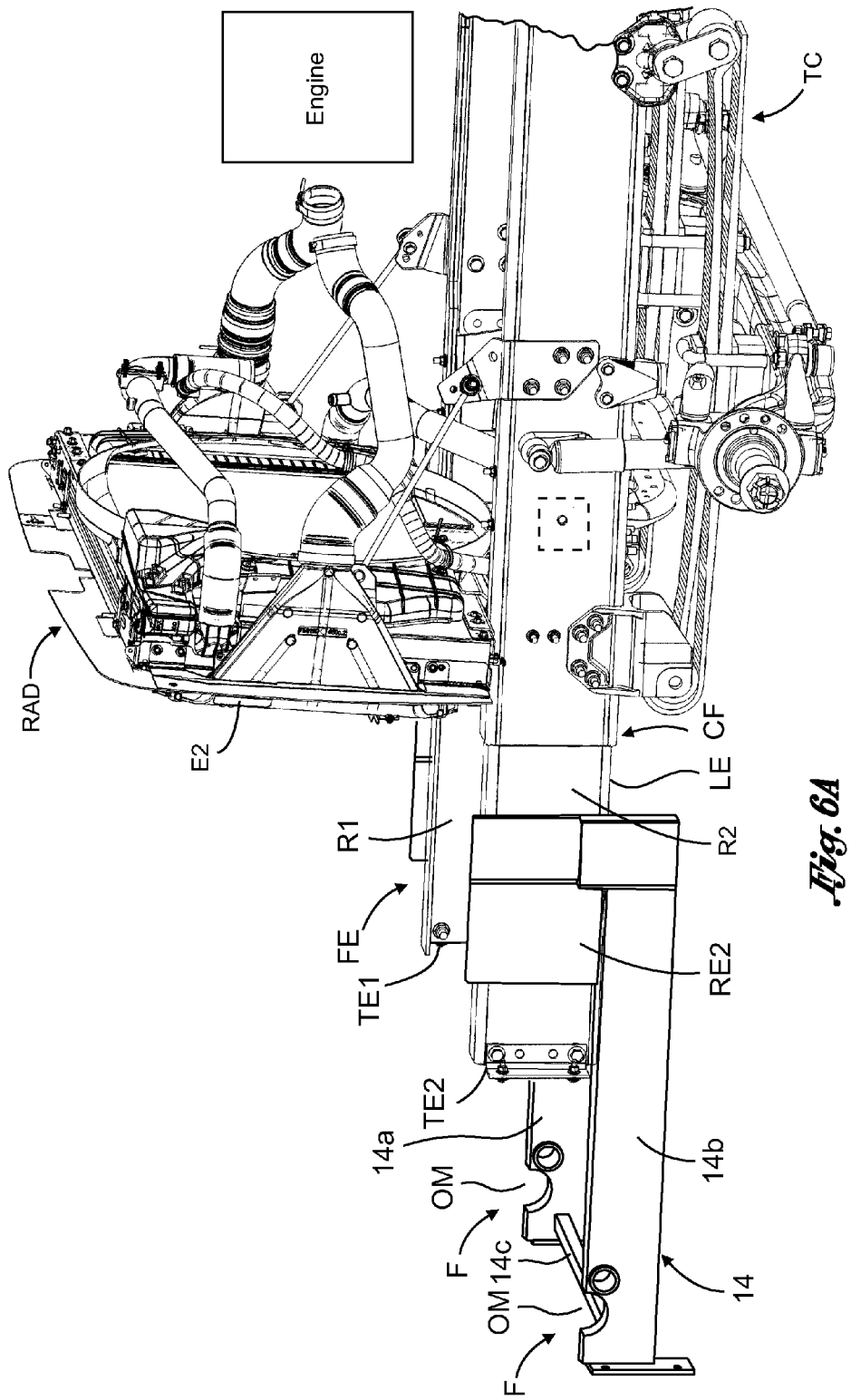
FIG. 6A is a fragmentary, side perspective view of the standard truck chassis shown in FIG. 1 modified with a bracket for pivotally mounting the cab to the chassis in advance of a radiator on the chassis' topside.
Figure 6B:
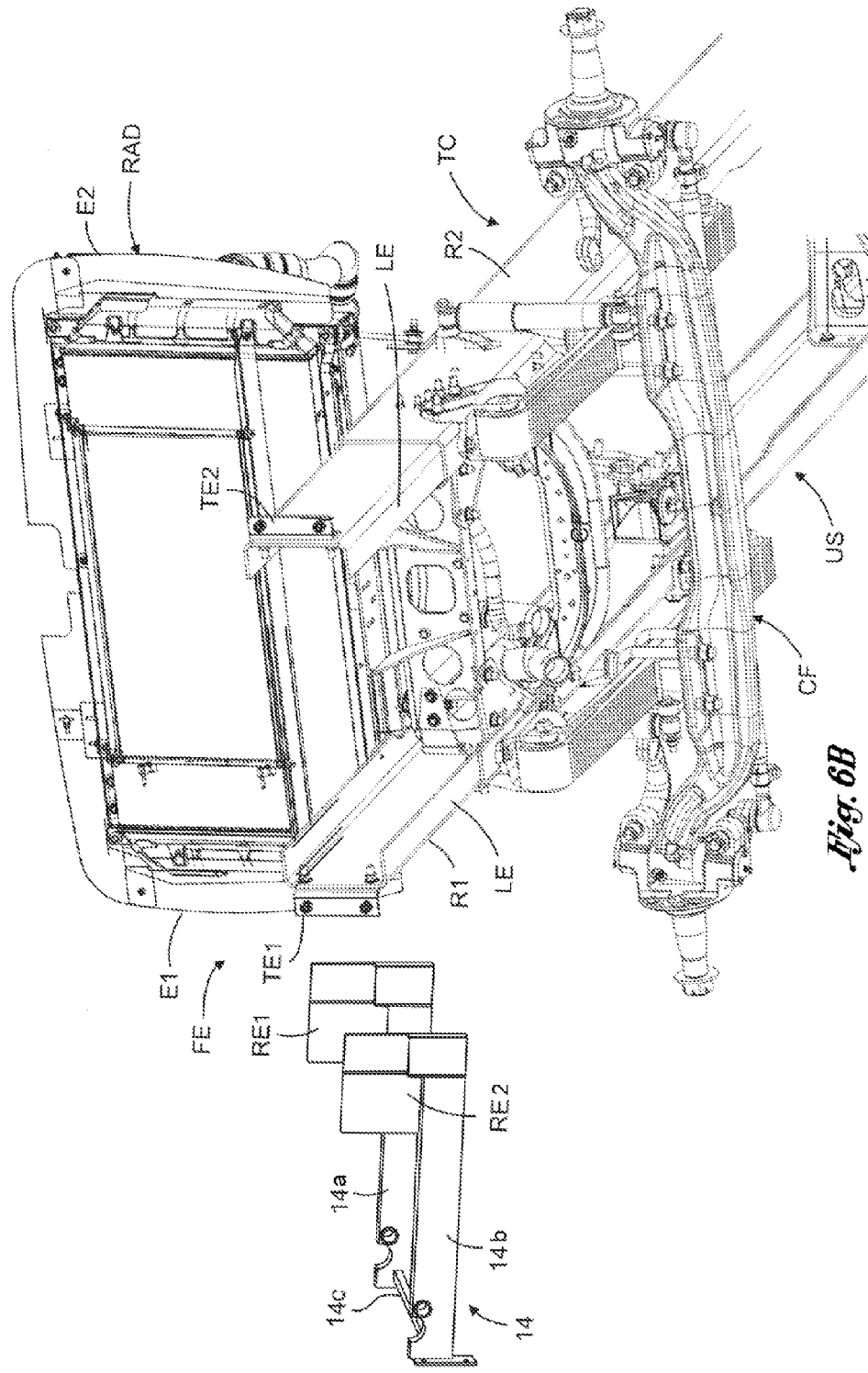
FIG. 6B is a partially exploded front perspective view of an underside of the standard truck chassis shown in FIG. 1 modified with a bracket for pivotally mounting the cab to the chassis in advance of a radiator on the chassis.
Figure 9:
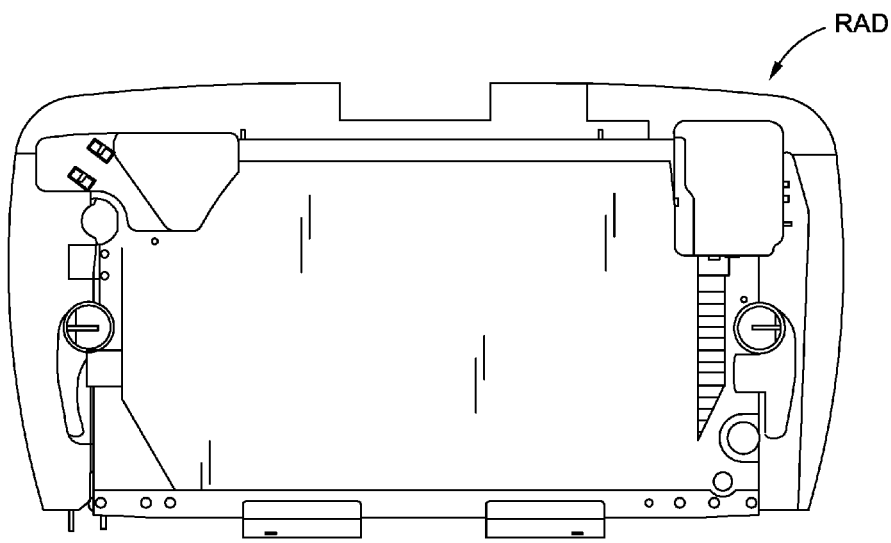
FIG. 9 is a front view of the radiator on the standard truck chassis.
Figure 10:
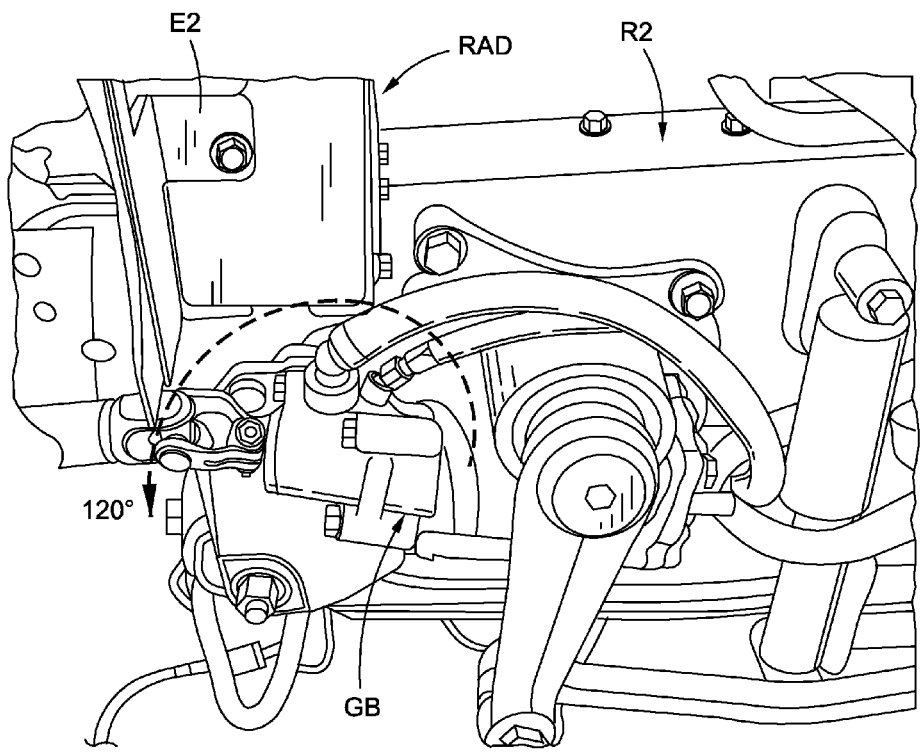
FIG. 10 is a side view similar to that of FIG. 1C showing the relocated gearbox.
Figure 11A:
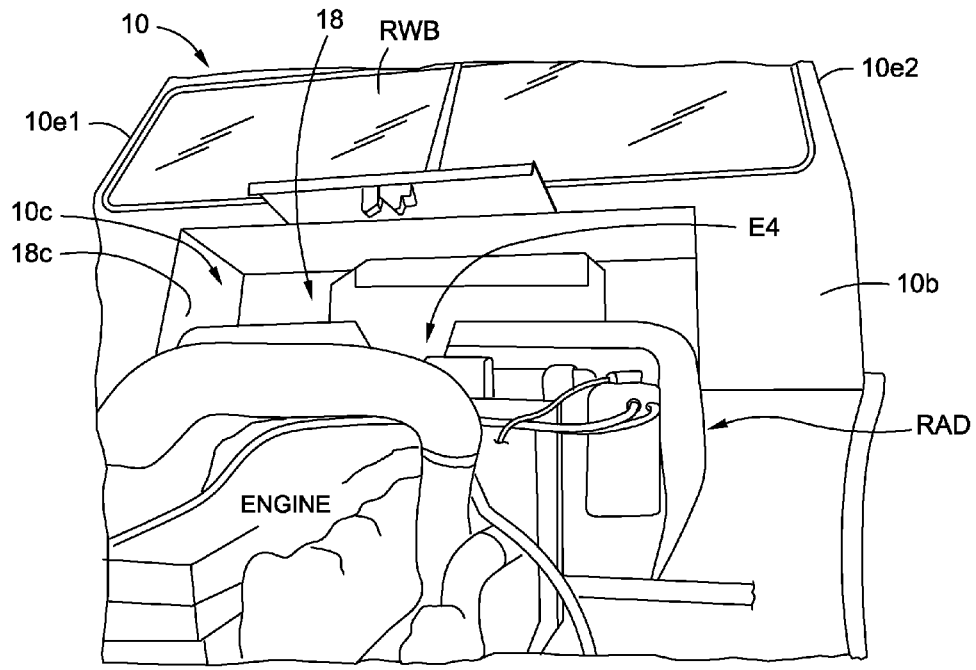
FIG. 11A is a rear perspective view of my cab on the standard truck chassis tilted forward in the uncovered position.
Figure 11B:
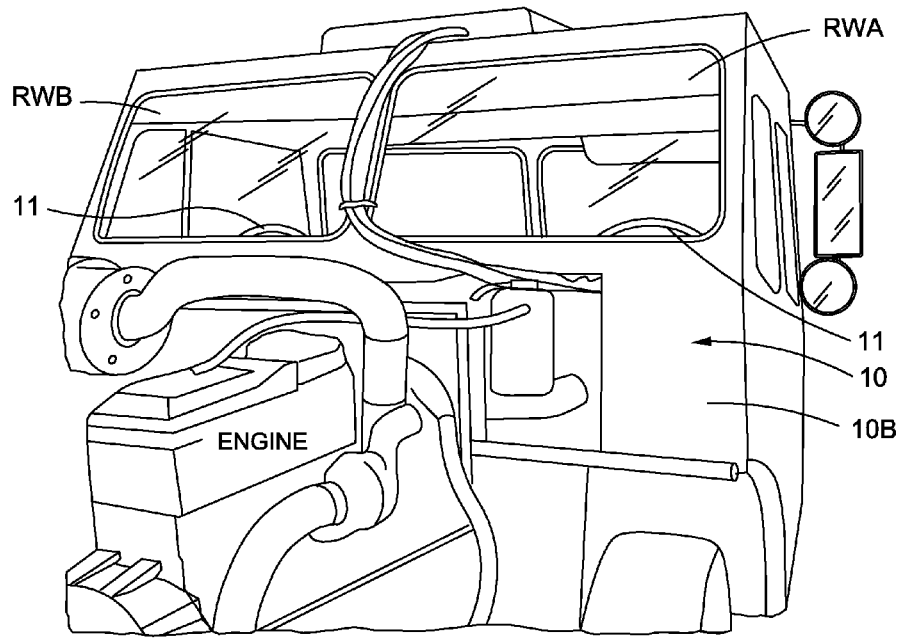
FIG. 11B is a rear perspective view of my cab on the standard truck chassis in the covered position.
Figure 11C:
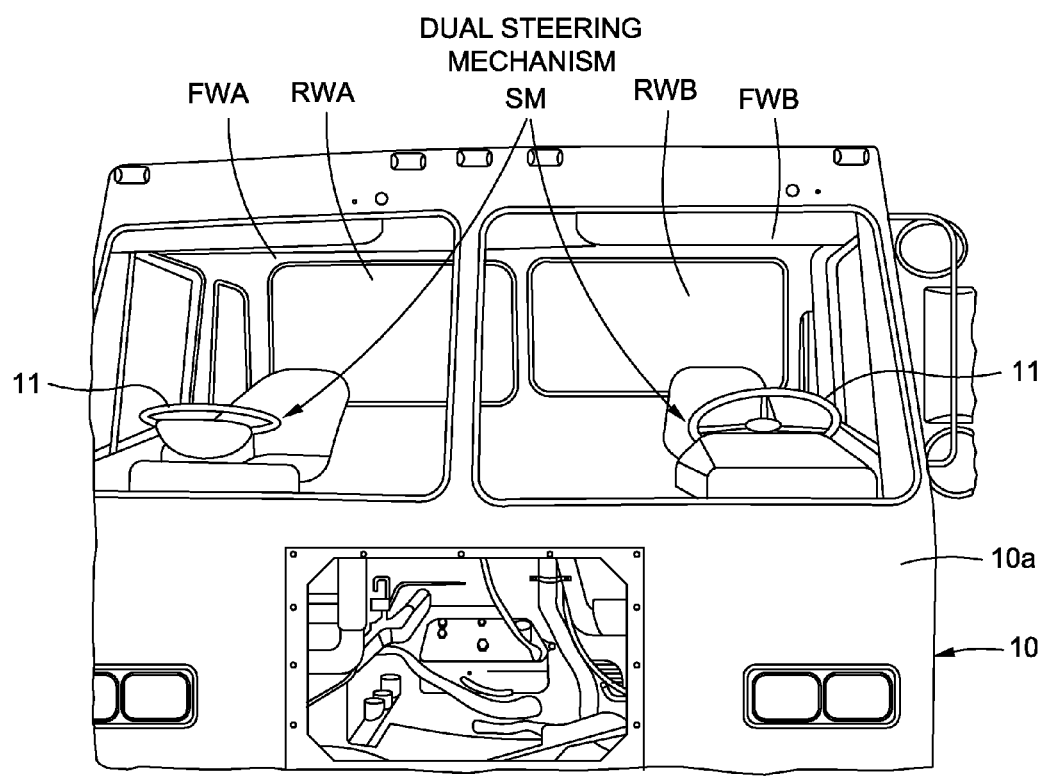
FIG. 11C is a front perspective view of my cab on the standard truck chassis in the covered position.
Figure 11D:
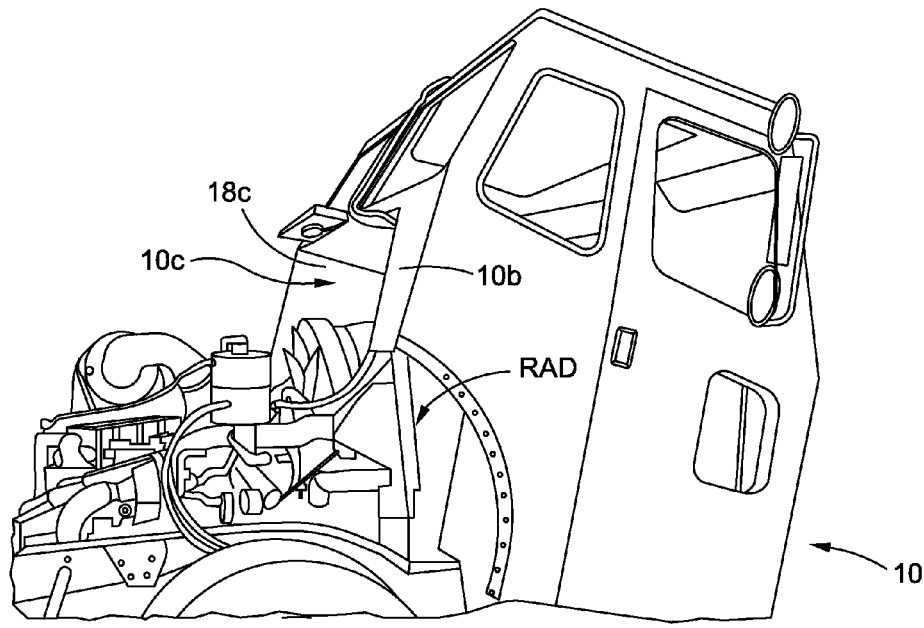
FIG. 11D is a side perspective view of my cab on the standard truck chassis tilted forward in the uncovered position.
Figure 11E:
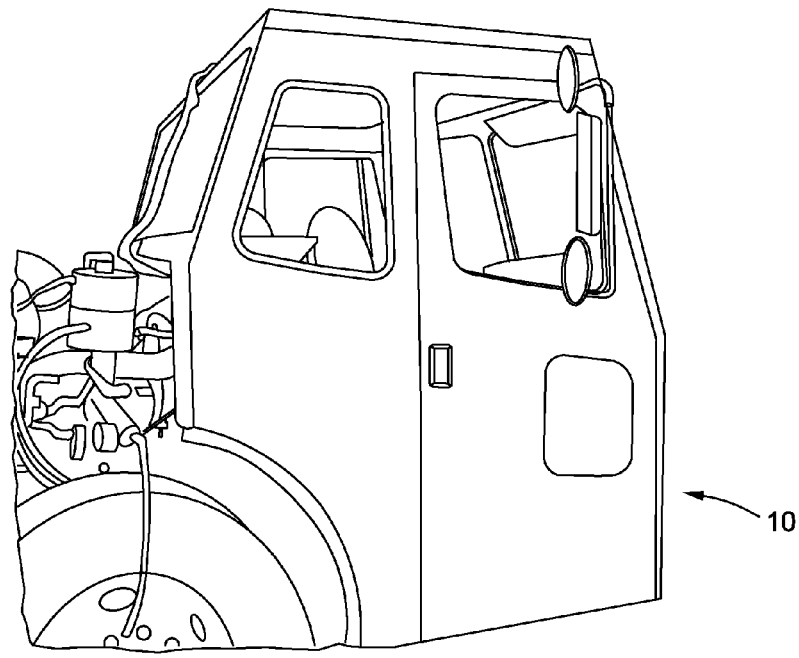
FIG. 11E is a side perspective view of my cab on the standard truck chassis in the covered position.
Figure 12A:
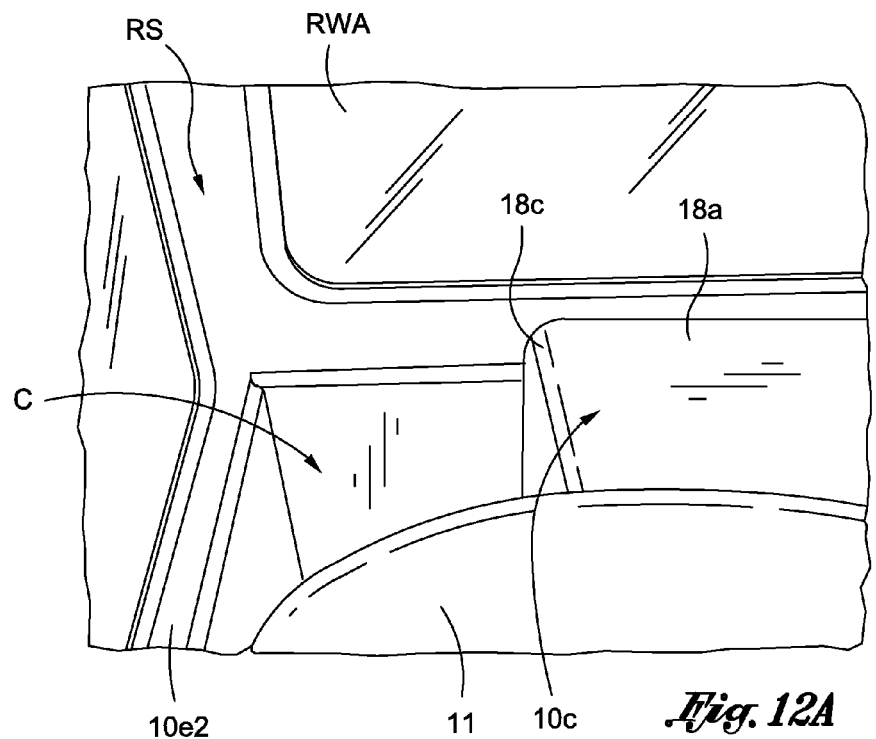
FIG. 12A is a perspective view of the interior of my cab looking out the starboard side rear window of my cab.
Figure 12B:
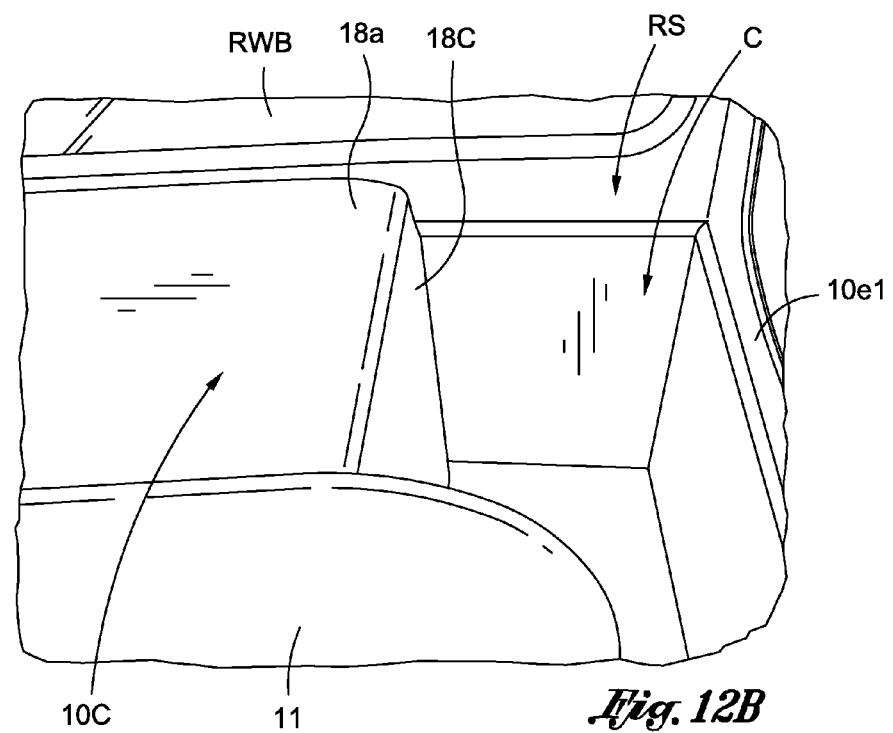
FIG. 12B is a perspective view of the interior of my cab looking out the port side rear window of my cab.

The cab mounting bracket 14 has a substantially U-shaped configuration with a pair or arms 14a and 14b and a crosspiece 14c connected substantially at a right angle between the arms. Each arm 14a and 14b has a substantially semi-circular shaped recess 14d1 and 14d2, respectively, that upon attaching the bracket to the chassis faces upwardly so each presents an open mouth OM (FIG. 6A) that accepts a rod 14e in the lower portion of the front side 10a of my cab 10. The recesses 14d1 and 14d2 are aligned and jointly function as the fulcrum F that enable the rod 14e to turn and rotated either clockwise or counter-clockwise within the recesses, allowing my cab 10 to pivot and expose the radiator RAD and ENGINE when service is to be performed. As depicted in FIGS. 6A and 6B, each bracket arm 14a and 14b has a remote end RE1 and RE2, respectively, attached to one rail (the arm 14a to rail R1 and arm 14b to rail R2) and positioned so that the open mouths OM of the aligned recesses are beneath the lower edges LE of the rails R1 and R2 and at least 20 inches in advance of the terminal ends TE1 and TE2. Typically the aligned recesses 14d1 and 14d2 are substantially from 20 to 30 inches in advance of the terminal ends TE1 and TE2. In other words, each bracket arm 14a and 14b is attached to one rail and positioned so that the aligned recesses 14d1 and 14d2 function as the fulcrum F and are beneath the lower edges LE of the rails R1 or R2. After attaching the cab-mounting bracket 14 to the standard truck chassis TC, it has a forward end segment FES including the fulcrum F that extends from the front end FE of the chassis frame CF. This forward end segment FES is lower than the underside US of the chassis frame CF and is nearby and inward of the front side 10a of the cab 10.

As best illustrated in FIGS. 3A through 3E, my cab 10 includes a front side 10a, a rear side 10b including a radiator compartment 10c, a floor side 10d between the front side and the rear side that has a pair of spaced apart aligned platforms A and B in substantially the same plane, a port side 10e1 and a starboard side 10e2, a door opening 10f (FIG. 4A) in each side providing an entryway having a lower edge 10g substantially flush with the floor side, and a roof side 10h. The typical dimensions of my cab 10 are: width w—substantially from 84 to 96 inches, height h—substantially from 68 to 80 inches, and length l substantially from 60 to 70 inches. The predetermined distance the floor side 10d is above ground level in the covered position is substantially from 16 to 22 inches and the floor is substantially parallel to ground level, The lower base section LBS and upper window section UWS are joined along the junction J at about midway between the floor side 10d and the roof side 10h. My cab 10 is designed to accommodate two adult riders, seated or standing. The front side 10a has a pair of enlarged rectangular windows FWA and FWB of substantially the same dimensions, each having an area of at least 1200 square inches, and the rear side 10b has a pair of enlarged rectangular windows RWA and RWB of substantially the same dimensions, each having an area of at least 300 square inches. In the covered position, the floor 10d is substantially parallel to and above ground level a relatively short distance, for example, no greater than 22 inches and typically substantially from 16 to 22 inches. This enables at least an average sized adult person to enter one side entryway 10e through the door opening 10f by stepping from ground level directly into the cab 10 without the aid of a step.

As best shown in FIGS. 3B through 3E and FIG. 11A and FIGS. 13A through 13I, the interior of my cab 10 is partitioned into a front section FS (FIG. 3C) and a rear section RS (FIG. 3C), with the front section sized to allow the adult riders to stand or sit while in the my cab 10. The front interior of my cab 10 has a distance between the floor 10d and the roof side 10h that is essentially equal to the height h, thus allowing either rider to stand upright and erect and steer either seated or standing. A standard duel steering mechanism SM (FIG. 11C) at the front interior of my cab 10 enables either rider to steer. A centrally located air tunnel T is oriented lengthwise along the centerline X within the interior of my cab 10. As best shown in FIGS. 13H and 13I, the air tunnel T includes a pair of spaced apart substantially parallel internal sidewalls 18b (FIG. 13H) and 18c (FIG. 13I) connected at upper ends by a topside 18d and connected at lower ends to the floor side 10d. An empty upper storage section 20a within the tunnel T provides storage space, for example, for control devices, and a lower empty channel section 20b forms an air conduit or channel between the sidewalls 18b and 18c. The channel section 20b of the tunnel T extends from a front end E3 at the air opening 16 in the front side 10a to a rear end E4 at an inwardly offset, rear, lower wall 18 forming the lower portion of the rear side 10b. Consequently, the tunnel T provides a passageway that directs air to the radiator RAD when the ENGINE is operational and my cab 10 is in the covered position. The rear channel section 20b terminates at the radiator compartment 10c. In this embodiment, all of the radiator RAD, and a front portion of the ENGINE is under the rear section RS of my cab 10 when my cab is in the covered position.

Figure 13A:
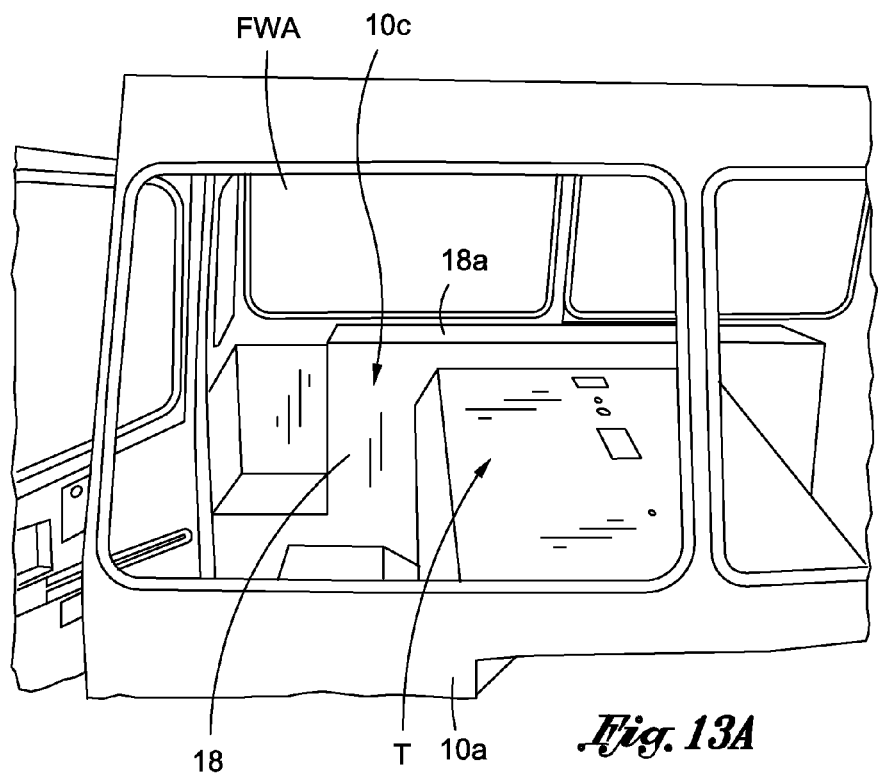
FIGS. 13A through 13I are exterior and interior views of my cab only partially fabricated and without the seats and steering mechanism where.
Figure 13B:
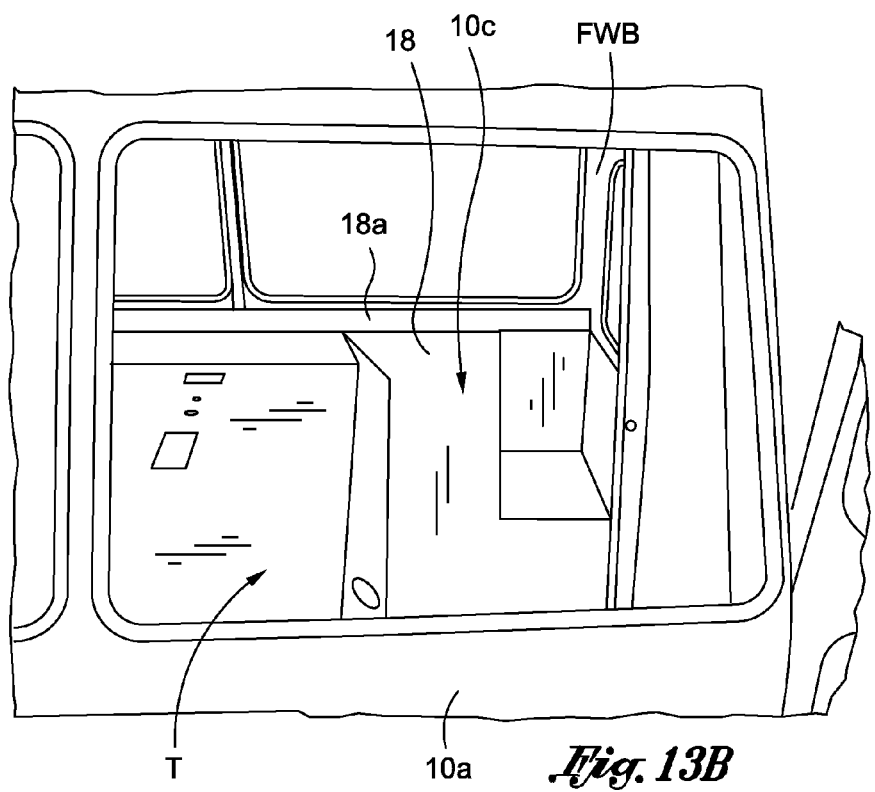
Figure 13C:
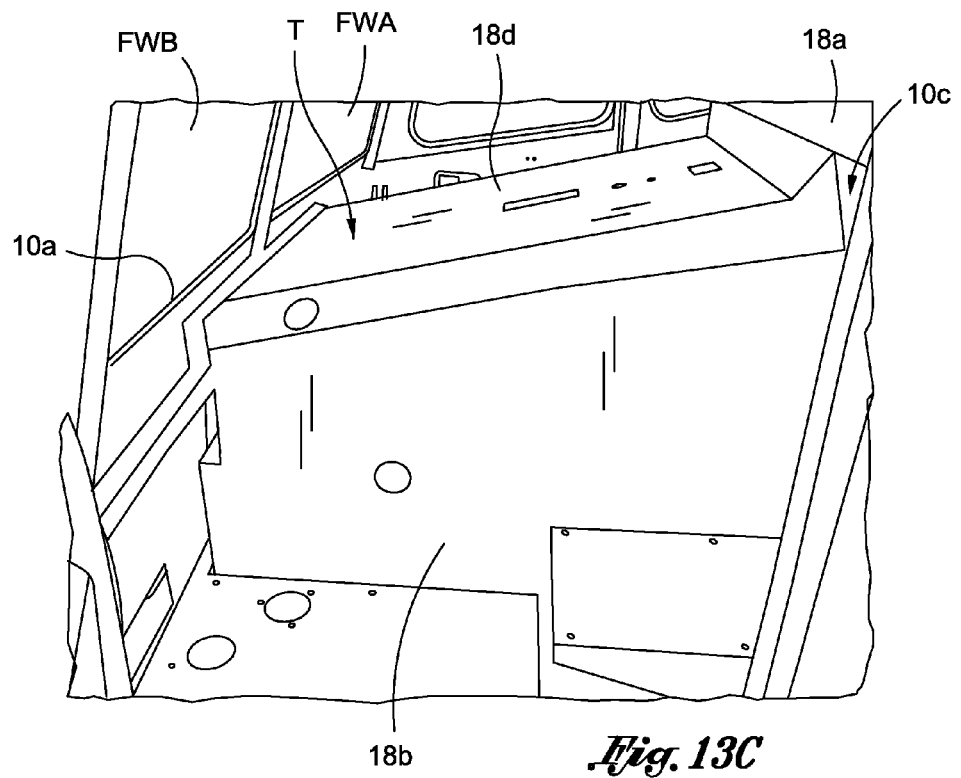
Figure 13D:
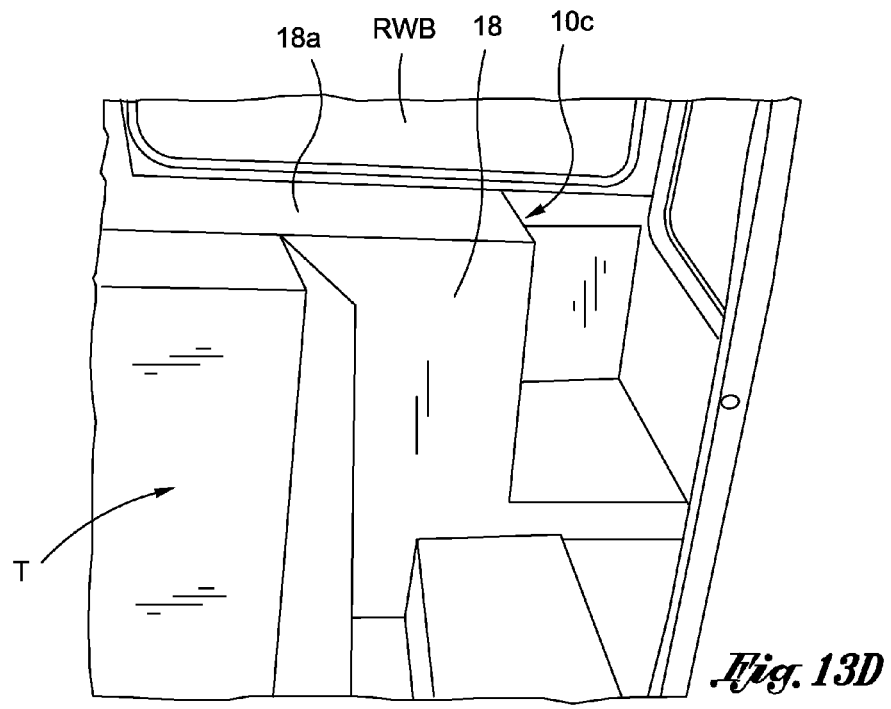
Figure 13E:
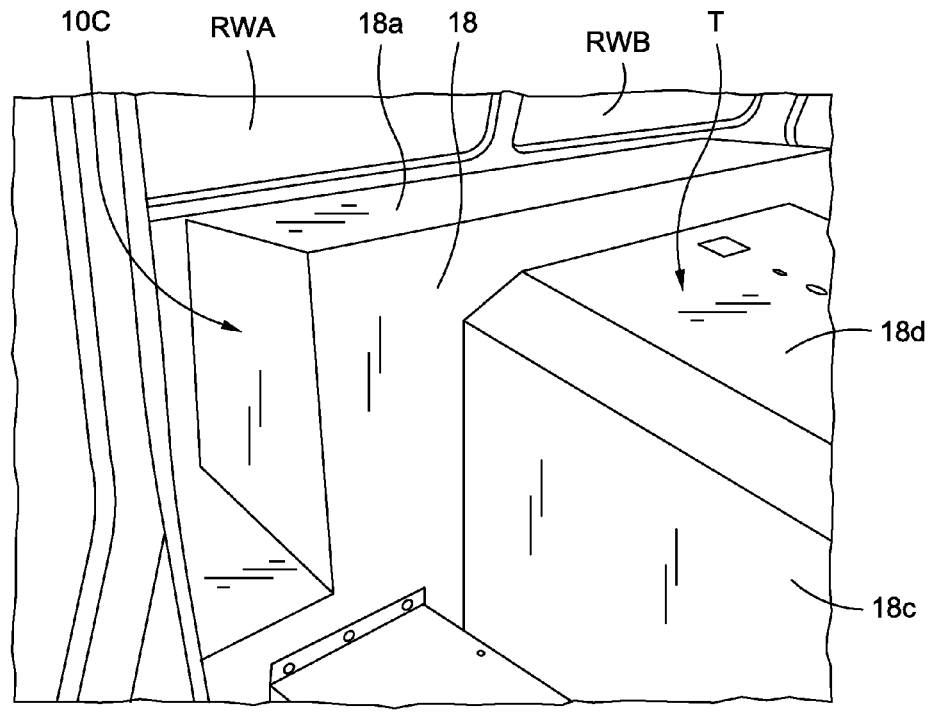
Figure 13F:
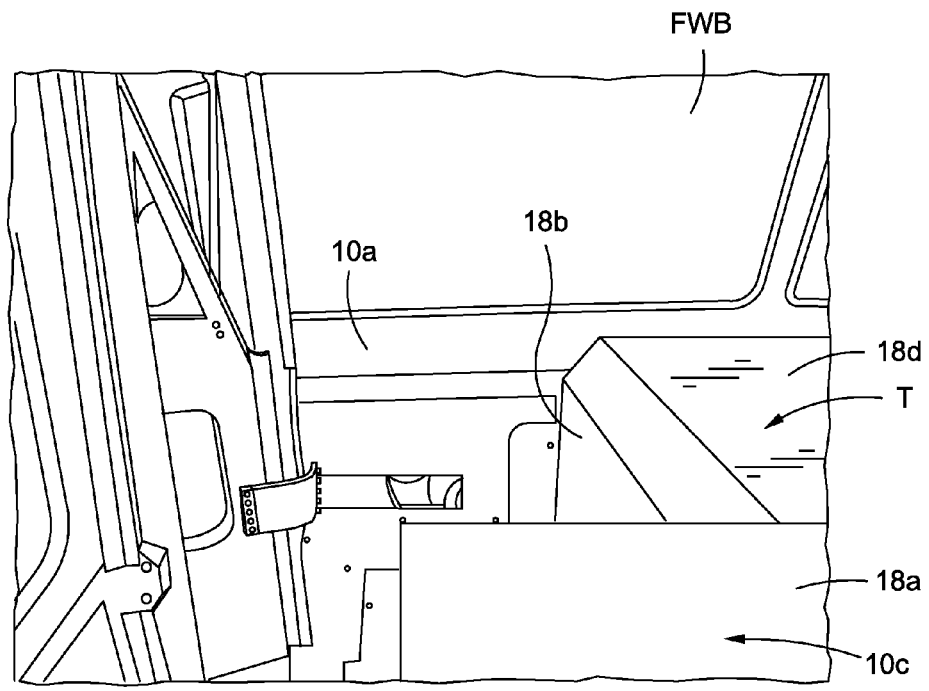
Figure 13G:
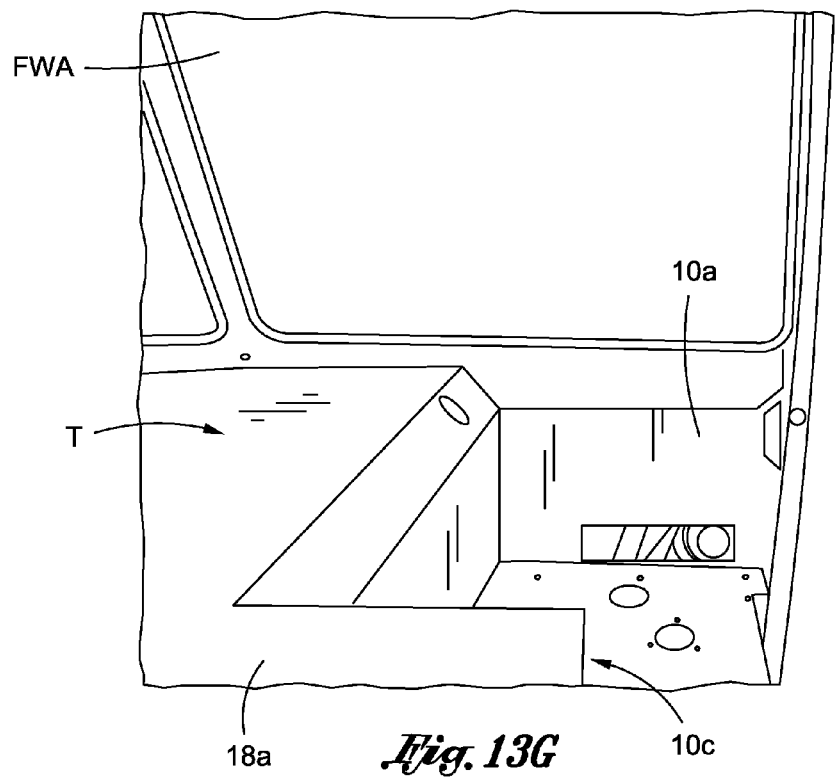
Figure 13H:
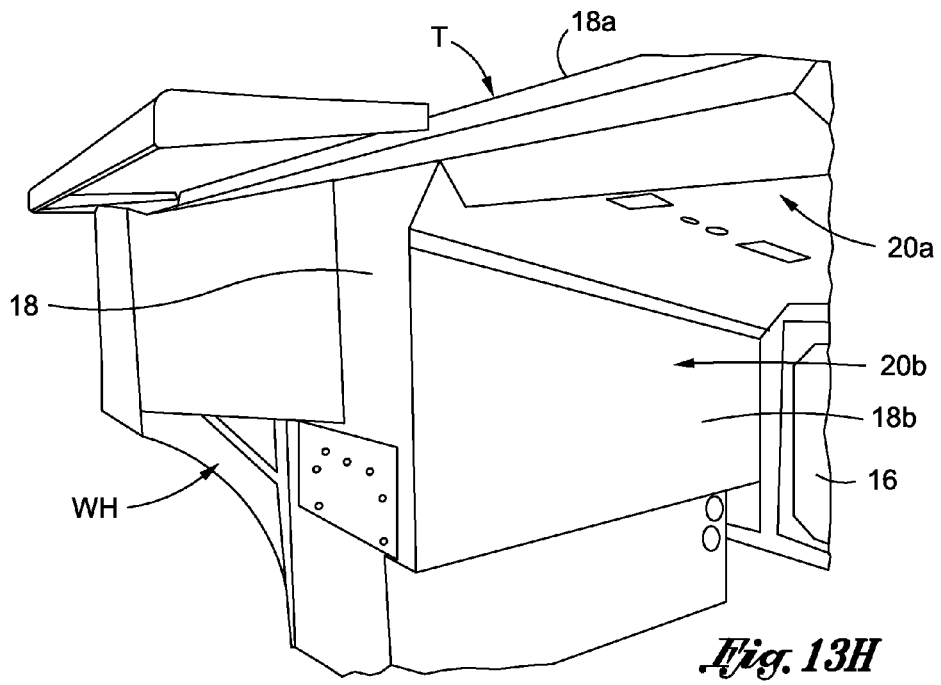
Figure 13I:
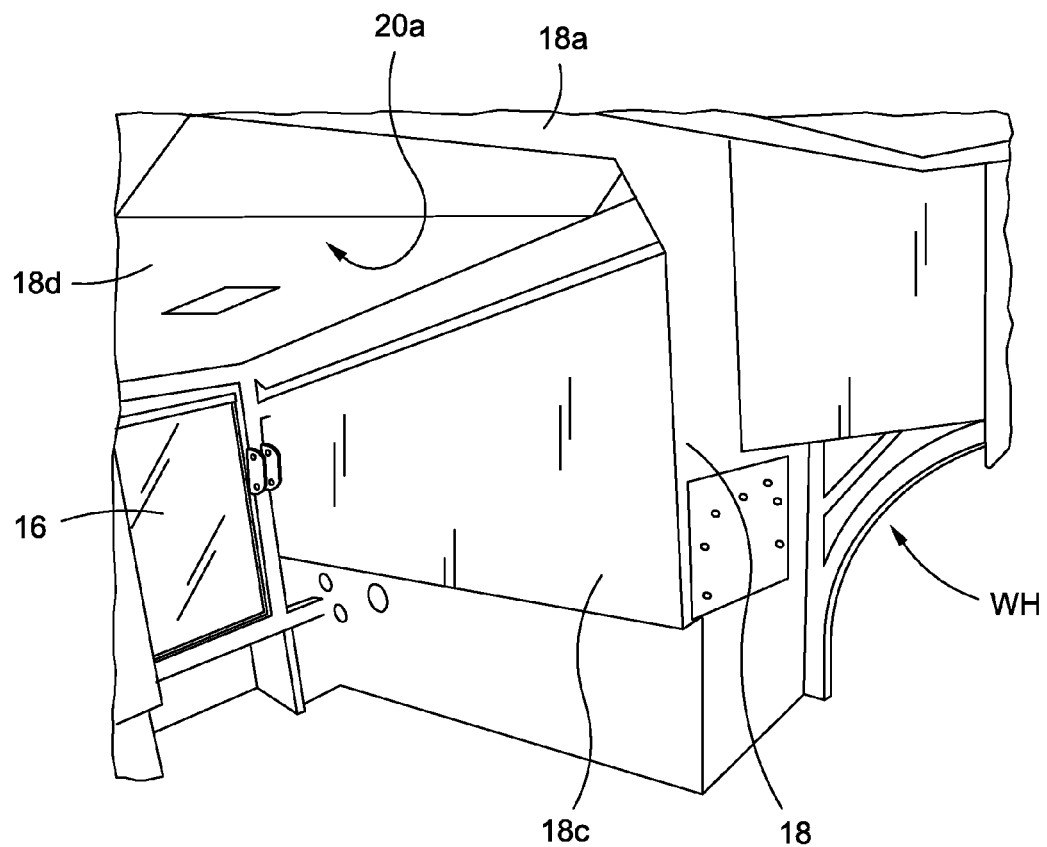
Figure 14A:
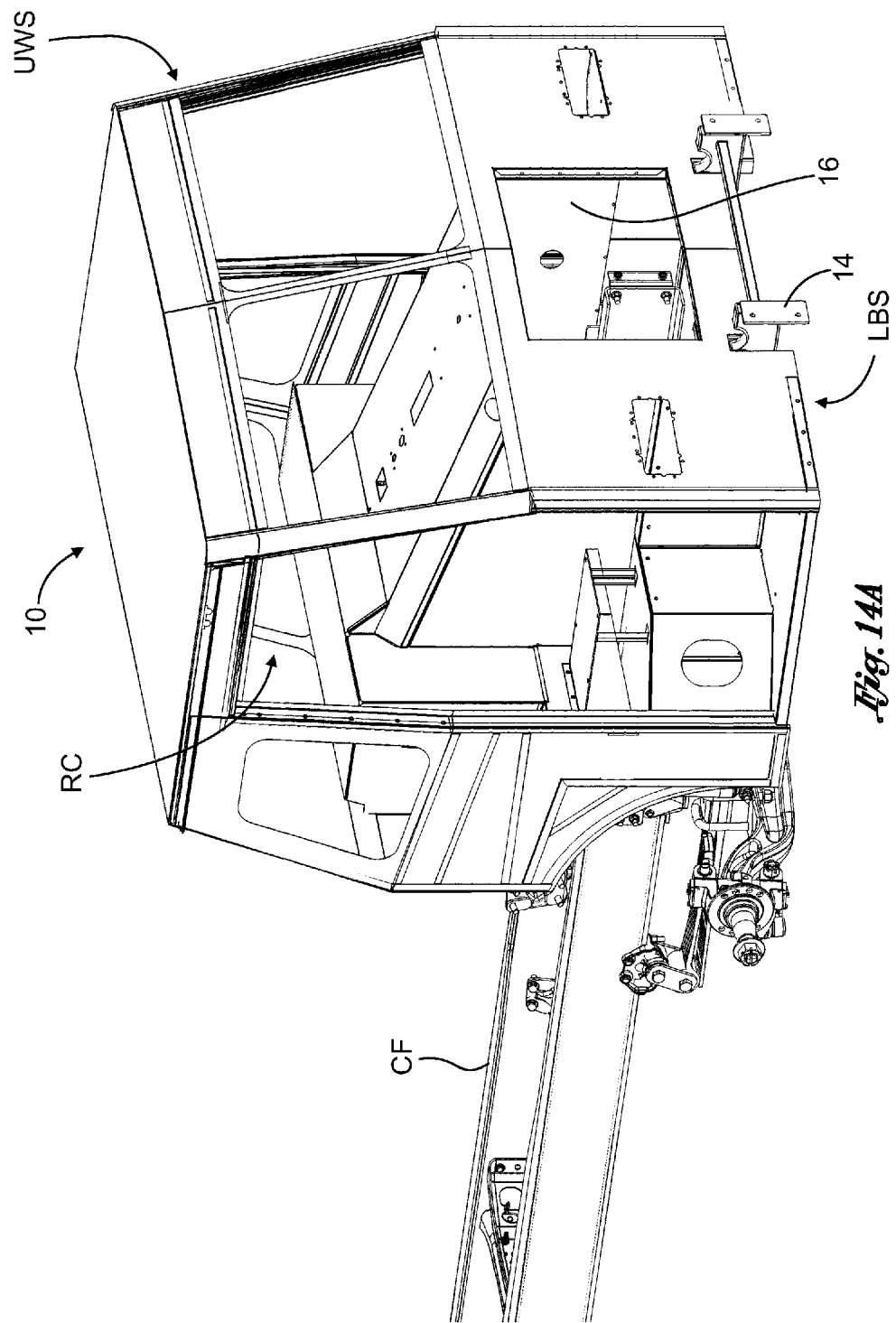
FIG. 14A is a perspective view of my cab mounted to the front end of the standard truck chassis with doors and others structure removed to show the interior of my cab.
Figure 14B:
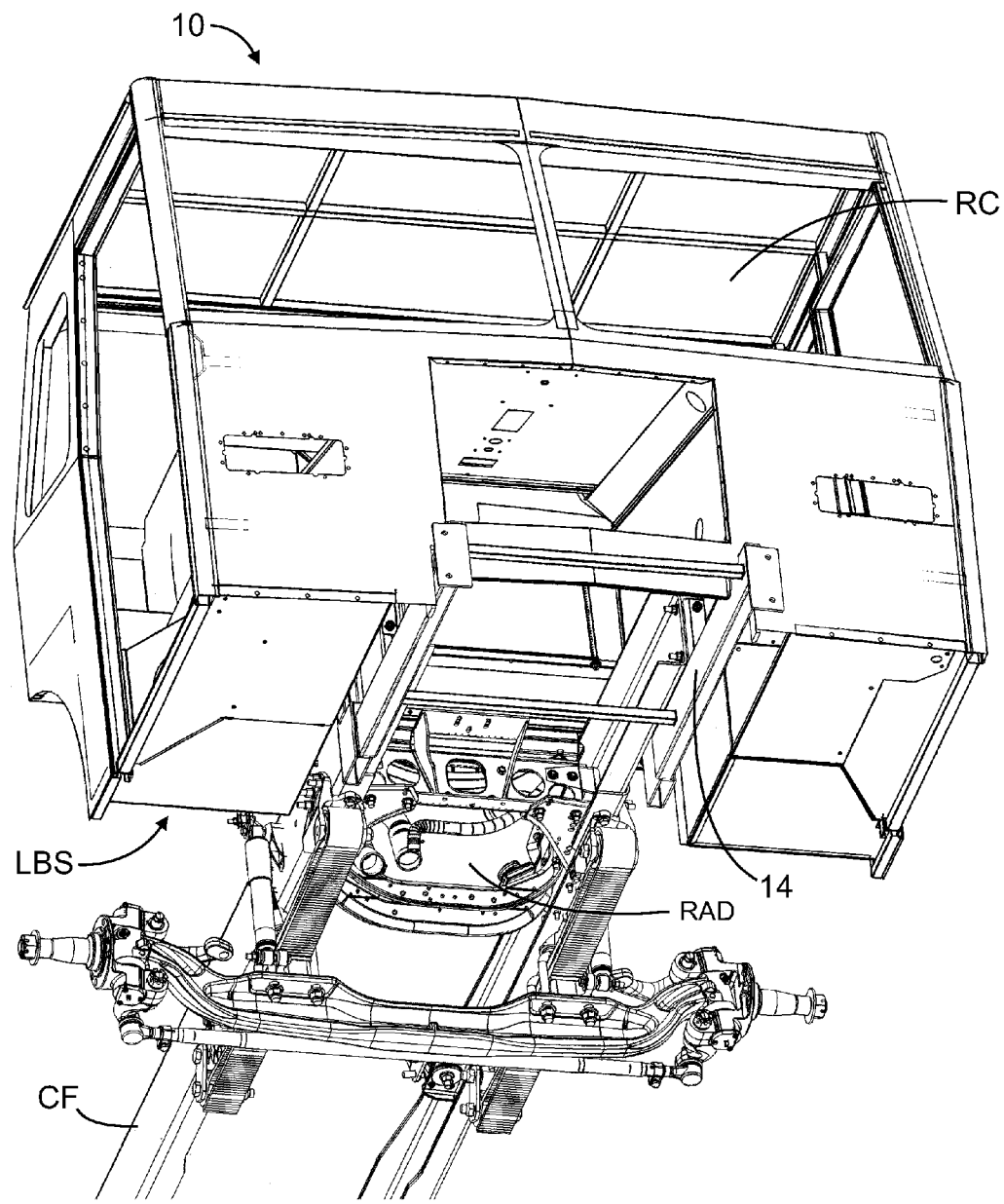
FIG. 14B is a perspective view of my cab mounted to the front end of the standard truck chassis as depicted in FIG. 14A looking at the underside of the cab and chassis assembly.
Figure 14C:
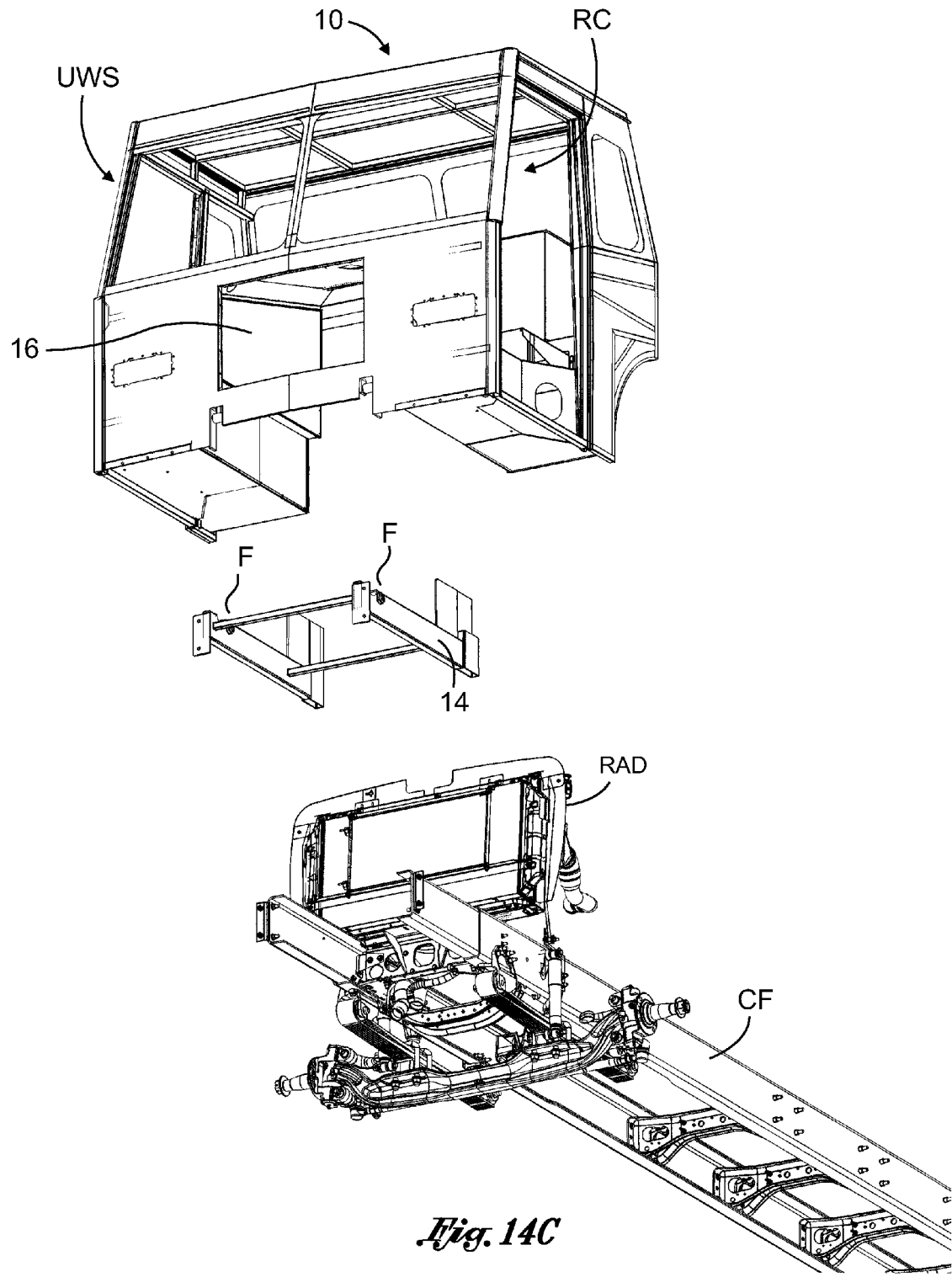
FIG. 14C is an exploded perspective view of my cab and chassis assembly shown in FIGS. 14A and 14B looking at the front of the vehicle.
Figure 14D:
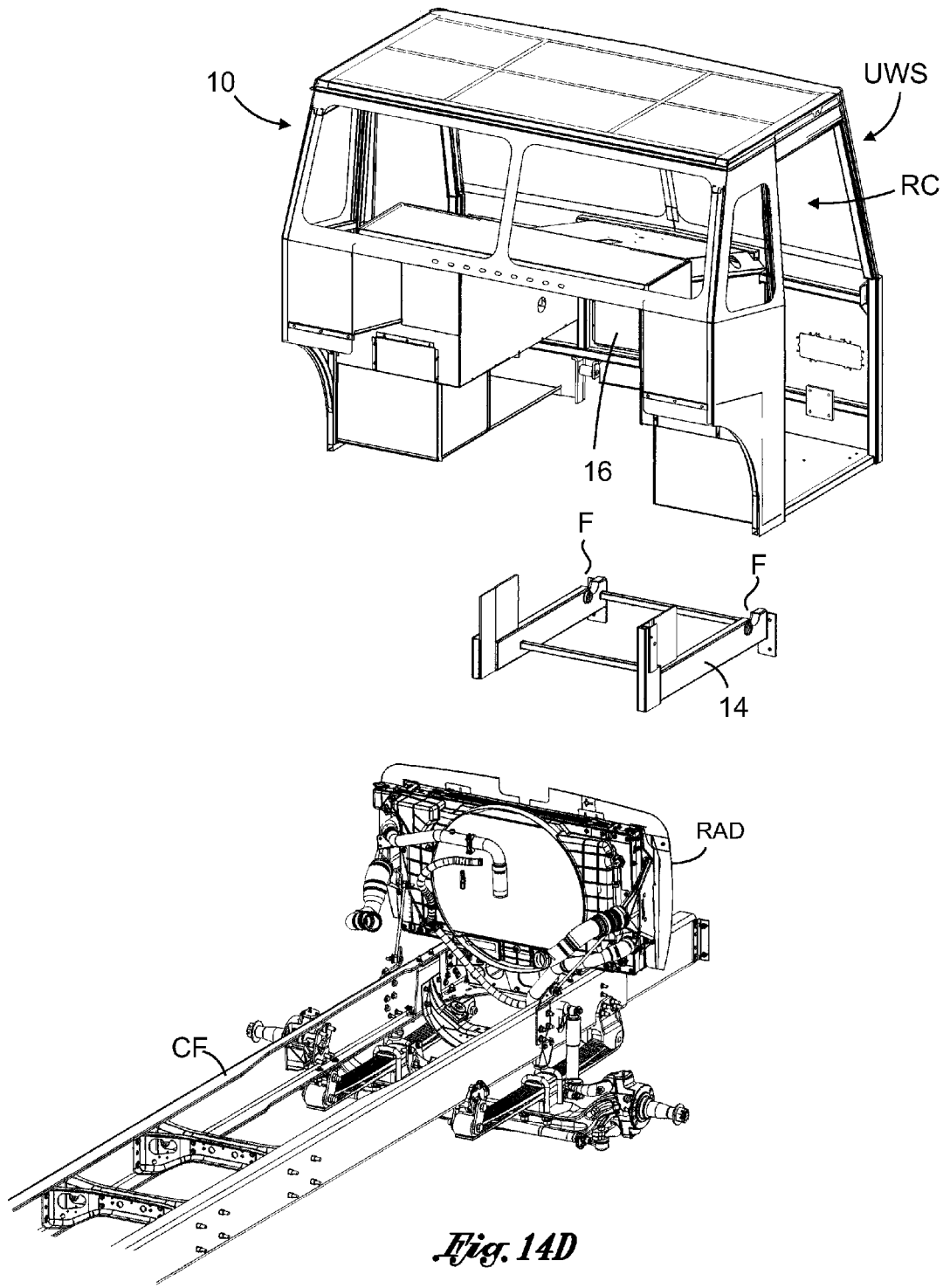
FIG. 14D is an exploded perspective view of my cab and chassis assembly shown in FIGS. 14A and 14B looking at the rear of the vehicle.

As illustrated in FIGS. 13D and 13E, the rear wall 18 is centrally disposed along the centerline X and has a width that is less than the width of my cab 10. Its height terminates at about midway between the roof side 10h and the floor side 10d in a horizontal ledge 18a that is the top of the radiator compartment 10c. This horizontal ledge 18a extends outward from the rear wall 18 and its outer edge is immediately below the rear windows RWA and RWB and its inner edge is immediately above the end E4 of the tunnel T. A pair of substantially parallel side walls sidewalls 18e and 18f at substantially a right angle are at the outer opposed ends of the horizontal ledge 18a slightly inward of their respective starboard side 10e2 and port side 10e1, forming storage cavities C on either side of the radiator compartment 10c, respectively, above wheel housings WH (FIGS. 13H and 13I) for the forward wheels W (FIG. 1) of the truck chassis. A pair of normally folded seats 11 (FIGS. 4A and 12A and 12B) is attached to spaced apart horizontal mounts below and inward of the cavities and extending into the interior of the cab from the rear wall 18. When unfolded, seats are thus provided for the riders.

In accordance with my method of manufacturing a refuse vehicle, my cab 10 is mounted to the front end FE of the chassis frame CF. When off-line of the manufacture of the chassis, first the standard truck chassis TC is made using conventional assembly line production practices, and next, typically at another manufacturing facility to which the standard truck chassis TC is shipped, my cab 10 is then mounted to the chassis with only minimum changes to the chassis. For example, a truck may be delivered to the manufacturing facility with the conventional, nose in front cab CC in place as shown in FIG. 1 and then the conventional, nose in front cab CC is detached and my cab attached subsequently. Or, the standard truck chassis TC is delivered with the conventional, nose in front cab CC. Another example is a gearbox GB is relocated from its normal position shown in dotted lines in FIG. 1C to the position shown in FIG. 10. Mounted in its normal position the gearbox GB would interfere with mounting my cab 10 to the standard chassis TC. Thus, the gearbox is repositioned to avoid interfering with mounting my cab 10 to the standard truck chassis TC. The gearbox GB is detached from the rail R2, rotated substantially from 100° to 130°, for example, 120°, and reattached to the side of the rail R2 below the overlapping end E2 of the radiator RAD. Also, a bumper bracket BB at the front end FE of the standard truck chassis TC is removed as depicted in FIG. 6B, exposing terminal ends TE1 and TE2, respectively, of the rails R1 and R2, thus avoiding interfering with mounting my cab 10 to the standard chassis TC.

Because of the manner of mounting my cab to a standard truck chassis as discussed above, (1) a single large sized radiator (rather than multiple radiators) needed to cool more powerful engines is mounted to the top of the mass-produced standard chassis straddling the chassis rails, and (2) my forward mounted cab completely overlies the radiator when in the covered position and can be entered without the aid of a step.

SCOPE OF THE INVENTION

The above presents a description of the best mode I contemplate of carrying out my method, cab and refuse vehicle and of the manner and process of making and using them, in such full, clear, concise, and exact terms as to enable any person skilled in the art to which they pertain to make and use. My method, cab and refuse vehicle are, however, susceptible to modifications and alternate constructions from the illustrative embodiments discussed above which are fully equivalent. Consequently, it is not the intention to limit my method, cab and refuse vehicle to the particular embodiments disclosed. On the contrary, my intention is to cover all modifications and alternate constructions coming within the spirit and scope of my method, cab and refuse vehicle as generally expressed by the following claims, which particularly point out and distinctly claim the subject matter of my invention:

The invention claimed is:
1. A refuse vehicle comprising
a container body for trash,
a standard chassis that carries the container body, said standard chassis having a chassis frame with a front end, a topside and an underside,
a radiator attached to the topside near the front end of the chassis frame,
an engine attached to the topside behind and near the radiator, and a cab mounted to the front end of the frame to enable the cab to pivot about a fulcrum between a covered position and an uncovered position, said fulcrum being in advance of the radiator and beneath the underside of the frame, said cab including a lower base section with a cavity in a rear portion thereof configured to cover a substantial portion of the radiator when the cab is in the covered position, where the cavity has a predetermined configuration so that said cab overlies essentially the entire radiator when the cab is in the covered position but leaves the engine substantially uncovered, and where the cavity has a depth sufficient so that, when the cab is in the covered position covering the radiator, a forward portion of the engine extends into the cavity.

2. A refuse vehicle comprising a standard chassis for carrying a container body of a refuse truck, said standard chassis having a chassis frame with a front end, a topside and an underside and comprising a pair of substantially parallel rails spaced apart a predetermined distance, a radiator attached to the topside near the front end of the chassis frame, an engine attached to the topside behind and near the radiator, and a pair of forward wheels at the front end, each wheel being outboard of an adjacent rail, and a cab mounted to the front end of the frame to enable the cab to pivot about a fulcrum between a covered position and an uncovered position, said fulcrum being in advance of the radiator and the forward wheels and beneath the underside of the frame, said cab including a front side, a rear side including a radiator compartment that at least partially encloses the radiator when the cab is in the covered position, a floor side between the front side and the rear side, a side entryway with a door opening having a lower edge substantially flush with the floor side, in the covered position said floor side being above ground level a predetermined distance to enable at least an average sized, able-bodied adult person to enter the side entryway through the door opening by stepping from ground level directly into the cab without the aid of a step, a cab mounting bracket that is attached to the frame and has a segment that extends from the front end of the chassis frame, said segment being lower than the underside of the frame and having a forward end including said fulcrum, said forward end being nearby and inward of the front side of the cab, where the cab mounting bracket has a substantially U-shaped configuration with a pair of arms and a crosspiece connected between the arms, each said arm having a recess, said recesses being aligned and functioning as the fulcrum.

3. A refuse vehicle comprising a standard chassis for carrying a container body of a refuse truck, said standard chassis having a chassis frame with a front end, a topside and an underside and comprising a pair of substantially parallel rails spaced apart a predetermined distance, a radiator attached to the topside near the front end of the chassis frame, an engine attached to the topside behind and near the radiator, and a pair of forward wheels at the front end, each wheel being outboard of an adjacent rail, and a cab mounted to the front end of the frame to enable the cab to pivot about a fulcrum between a covered position and an uncovered position, said fulcrum being in advance of the radiator and the forward wheels and beneath the underside of the frame, said cab including a front side, a rear side including a radiator compartment that at least partially encloses the radiator when the cab is in the covered position, a floor side between the front side and the rear side, a side entryway with a door opening having a lower edge substantially flush with the floor side, in the covered position said floor side being above ground level a predetermined distance to enable at least an average sized, able-bodied adult person to enter the side entryway through the door opening by stepping from ground level directly into the cab without the aid of a step, the rails are substantially linear and are spaced apart substantially from 30 to 38 inches, each said rail having a lower edge that is substantially from 26 to 36 inches above ground level and each said lower edge lying in essentially the same horizontal plane, where said radiator is centrally mounted along a longitudinal centerline of the chassis and has a width greater than the predetermined distance between said spaced apart parallel rails so the radiator straddles the rails and is oriented substantially at a right angle to the rails with opposed ends of the radiator extending beyond the rails.

4. A refuse vehicle comprising a standard chassis for carrying a container body of a refuse truck, said standard chassis having a chassis frame with a front end, a topside and an underside and comprising a pair of substantially parallel rails spaced apart a predetermined distance, a radiator attached to the topside near the front end of the chassis frame, an engine attached to the topside behind and near the radiator, and a pair of forward wheels at the front end, each wheel being outboard of an adjacent rail, and a cab mounted to the front end of the frame to enable the cab to pivot about a fulcrum between a covered position and an uncovered position, said fulcrum being in advance of the radiator and the forward wheels and beneath the underside of the frame, said cab including a front side, a rear side including a radiator compartment that at least partially encloses the radiator when the cab is in the covered position, a floor side between the front side and the rear side, a side entryway with a door opening having a lower edge substantially flush with the floor side, in the covered position said floor side being above ground level a predetermined distance to enable at least an average sized, able-bodied adult person to enter the side entryway through the door opening by stepping from ground level directly into the cab without the aid of a step, a cab mounting bracket that is attached to the frame and has a segment that extends from the front end of the chassis frame, said segment being lower than the underside of the frame and having a forward end including said fulcrum, said forward end being nearby and inward of the front side of the cab, where the cab mounting bracket has a substantially U-shaped configuration with a pair of arms and a crosspiece connected between the arms, each said arm having a recess, said recesses being aligned and functioning as the fulcrum, where the predetermined distance the floor side is above ground level in the covered position is substantially from 16 to 22 inches.

5. A cab adapted to be mounted to a standard truck chassis comprising means for mounting said cab to a front end of the standard truck chassis to enable the cab to pivot about a fulcrum between a covered position and an uncovered position, said fulcrum being in advance of a radiator attached to the standard truck chassis and beneath an underside of the standard truck chassis, a rider compartment including a front side, a rear side including a radiator compartment that at least partially encloses the radiator when the cab is mounted to the standard truck chassis and is in the covered position, a side entryway with a door opening having a lower edge substantially flush with a floor side of the cab, said floor side being between the front side and the rear side, and when the cab is mounted to the standard truck chassis and is in the covered position, said floor side being substantially from 16 to 22 inches above ground level and the fulcrum being substantially aligned with the floor side and being substantially the same distance above ground level as the floor, and an air conduit extending from an opening in the front side of the cab into the radiator compartment to direct air into the radiator as the vehicle moves.

6. The cab of claim 5 including a lower base section with a cavity in a rear portion thereof that includes an open portion in communication with the air conduit, said cavity configured to form the radiator compartment so that the cab overlies essentially the entire radiator when the cab is in the covered position.

7. A refuse vehicle comprising a container body for trash, a standard chassis that carries the container body, said standard chassis having a chassis frame with a front end and a topside, a radiator attached to the topside near the front end of the chassis frame, an engine attached to the topside behind and near the radiator, and a cab mounted to the front end of the frame to enable the cab to pivot about a fulcrum between a covered position and an uncovered position, said fulcrum being in advance of the radiator and beneath the frame, said cab including a lower base section with a cavity in a rear portion thereof configured to overlie substantially the entire radiator when the cab is in the covered position and no more than essentially 8 percent of the total volume of the engine including a cab mounting bracket that is attached to the frame and has a segment that extends from the front end of the chassis frame, said segment being lower than an underside of the frame and having a forward end including said fulcrum, said forward end being nearby and inward of the front side of the cab, said cab mounting bracket has a substantially U-shaped configuration with a pair of arms and a cross-piece connected between the arms, each said arm having a recess, said recesses being aligned and functioning as the fulcrum.

* * * * *